(12) United States Patent
Barton et al.

(10) Patent No.: US 7,185,809 B2
(45) Date of Patent: Mar. 6, 2007

(54) RF POINT OF PURCHASE APPARATUS AND METHOD OF USING SAME

(75) Inventors: Steven P. Barton, Chicago, IL (US); Paul Chibe, Chicago, IL (US)

(73) Assignee: Wm. Wrigley Jr. Company, Chicago, IL (US)

( * ) Notice: Subject to any disclaimer, the term of this patent is extended or adjusted under 35 U.S.C. 154(b) by 45 days.

(21) Appl. No.: 10/930,570

(22) Filed: Aug. 31, 2004

(65) Prior Publication Data

US 2005/0167493 A1    Aug. 4, 2005

Related U.S. Application Data

(63) Continuation-in-part of application No. 09/960,915, filed on Sep. 21, 2001.

(60) Provisional application No. 60/261,512, filed on Jan. 12, 2001.

(51) Int. Cl.
*G06K 15/00* (2006.01)
*G06F 7/08* (2006.01)
*A63F 9/02* (2006.01)
*G06Q 20/00* (2006.01)

(52) U.S. Cl. .................. 235/383; 235/381; 235/378; 186/59; 186/61; 705/16

(58) Field of Classification Search ................ 235/383, 235/378, 381, 385; 705/16, 17, 20, 26, 64; 186/59, 61
See application file for complete search history.

(56) References Cited

U.S. PATENT DOCUMENTS

| 3,006,538 A | 10/1961 | Deutsch |
| 3,138,385 A | 6/1964 | Giacobello |
| 3,786,421 A | 1/1974 | Wostl et al. |
| 4,111,282 A | 9/1978 | Vayda, Jr. |
| RE31,162 E | 3/1983 | Bachmann et al. |
| 4,614,384 A | 9/1986 | Takano et al. |
| 4,645,036 A * | 2/1987 | Nestler .................. 186/55 |
| 4,723,212 A | 2/1988 | Mindrum et al. |

(Continued)

FOREIGN PATENT DOCUMENTS

WO    WO 96/06415    2/1996

OTHER PUBLICATIONS

International Search Report for International Patent Application No. PCT/US05/28545 that corresponds to the present application and of which the references cited above as cited therein.

*Primary Examiner*—Jared J. Fureman
*Assistant Examiner*—Daniel Walsh
(74) *Attorney, Agent, or Firm*—Bell, Boyd & Lloyd LLC

(57) ABSTRACT

The present invention provides a checkout device that includes a purchasable item having an RFID tag affixed thereto and a scanner for detecting the RFID tag. A dispenser proximate to the scanner dispenses a point of purchase product upon selection by a user of the checkout device. A controller in operative communication with the scanner and the dispenser subsequently calculates the cost of the purchase item and the point of purchase product. A display device in operative communication with the controller displays the cost to the person using the checkout device.

39 Claims, 9 Drawing Sheets

U.S. PATENT DOCUMENTS

| | | | |
|---|---|---|---|
| 4,833,308 A | 5/1989 | Humble | |
| 5,019,694 A | 5/1991 | Collins, Jr. | |
| 5,173,851 A | 12/1992 | Off et al. | |
| 5,261,564 A | 11/1993 | Yelvington | |
| 5,586,686 A * | 12/1996 | Bustos et al. | 221/211 |
| 5,612,868 A | 3/1997 | Off et al. | |
| 5,725,124 A * | 3/1998 | Bustos et al. | 221/211 |
| 5,785,204 A * | 7/1998 | Thompson et al. | 221/24 |
| 5,813,569 A | 9/1998 | Cihanek | |
| 5,816,443 A * | 10/1998 | Bustos | 221/211 |
| 5,823,386 A | 10/1998 | Vandenberg | |
| 5,918,764 A * | 7/1999 | Bustos et al. | 221/211 |
| 5,943,241 A | 8/1999 | Nichols et al. | |
| 5,947,328 A | 9/1999 | Kovens et al. | |
| 5,978,772 A | 11/1999 | Mold | |
| 5,979,702 A | 11/1999 | Hennessey et al. | |
| 5,992,570 A * | 11/1999 | Walter et al. | 186/36 |
| 6,021,362 A * | 2/2000 | Maggard et al. | 700/234 |
| 6,038,492 A | 3/2000 | Nichols et al. | |
| 6,079,592 A | 6/2000 | Hennessey et al. | |
| 6,105,866 A | 8/2000 | Morrison et al. | |
| 6,116,505 A * | 9/2000 | Withrow | 235/381 |
| 6,119,099 A | 9/2000 | Walker et al. | |
| 6,161,059 A | 12/2000 | Tedesco et al. | |
| 6,164,491 A * | 12/2000 | Bustos et al. | 221/211 |
| 6,189,790 B1 | 2/2001 | Walter | |
| 6,193,154 B1 * | 2/2001 | Phillips et al. | 235/381 |
| 6,213,394 B1 * | 4/2001 | Schumacher et al. | 235/383 |
| 6,356,794 B1 * | 3/2002 | Perin et al. | 700/78 |
| 6,427,915 B1 | 8/2002 | Wike et al. | |
| 6,456,981 B1 | 9/2002 | Dejaeger et al. | |
| 6,540,137 B1 | 4/2003 | Forsythe et al. | |
| 6,547,040 B2 * | 4/2003 | Goodwin, III | 186/61 |
| 6,550,582 B2 | 4/2003 | Addy et al. | |
| 6,598,790 B1 * | 7/2003 | Horst | 235/383 |
| 6,722,473 B1 * | 4/2004 | Ramachandran et al. | 186/36 |
| 2002/0139617 A1 * | 10/2002 | Goodwin, III | 186/61 |
| 2002/0145037 A1 * | 10/2002 | Goodwin, III | 235/383 |
| 2003/0024982 A1 * | 2/2003 | Bellis et al. | 235/383 |
| 2003/0113094 A1 | 6/2003 | Tewksbury | |
| 2003/0132918 A1 | 7/2003 | Fitch et al. | |
| 2003/0146280 A1 * | 8/2003 | Acosta et al. | 235/454 |
| 2004/0069848 A1 * | 4/2004 | Persky | 235/383 |
| 2004/0189472 A1 * | 9/2004 | Acosta et al. | 340/572.3 |
| 2004/0195334 A1 * | 10/2004 | Silverbrook et al. | 235/462.14 |
| 2004/0220860 A1 * | 11/2004 | Persky et al. | 705/23 |
| 2005/0128087 A1 * | 6/2005 | Claessens et al. | 340/572.8 |
| 2005/0211720 A1 * | 9/2005 | Chirnomas | 221/92 |

\* cited by examiner

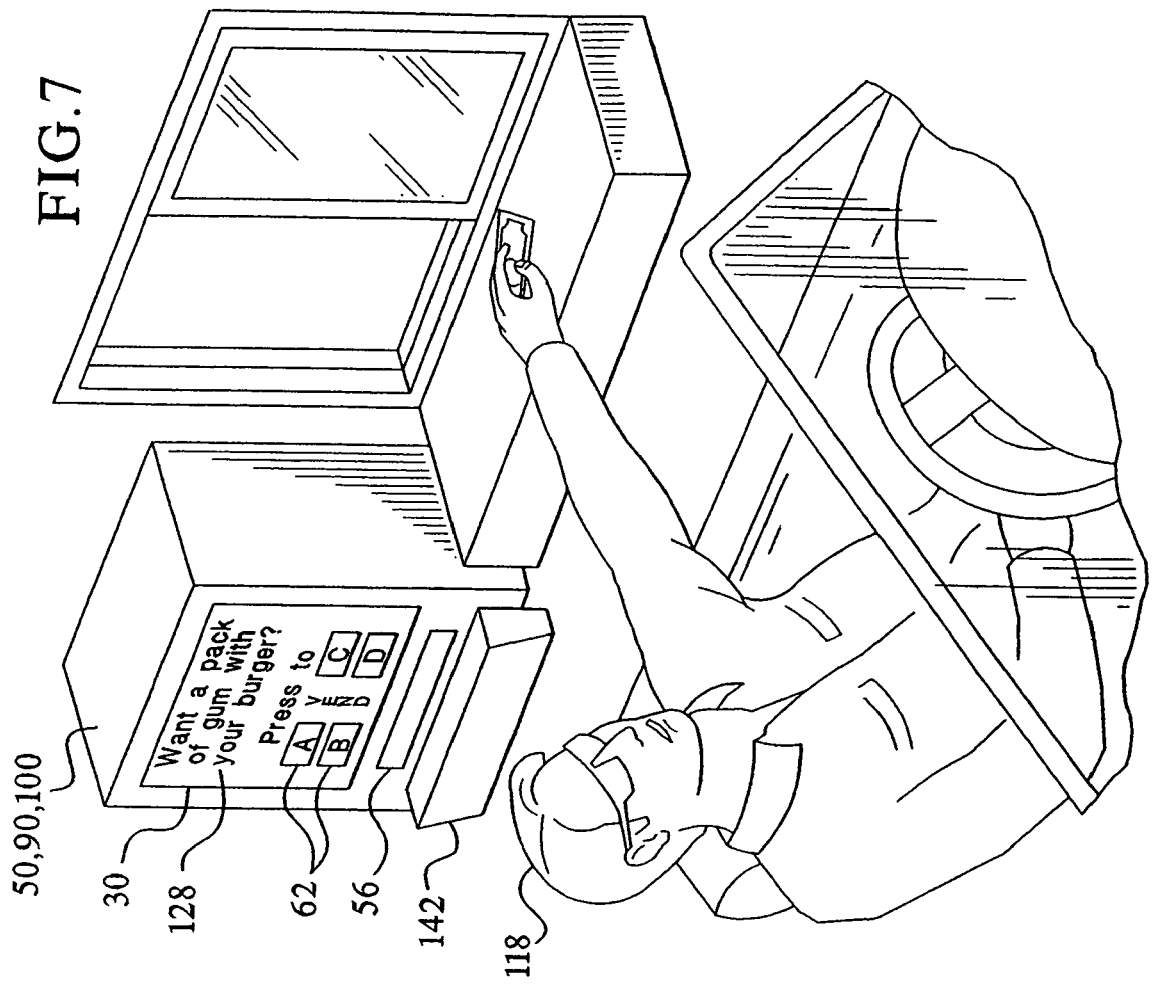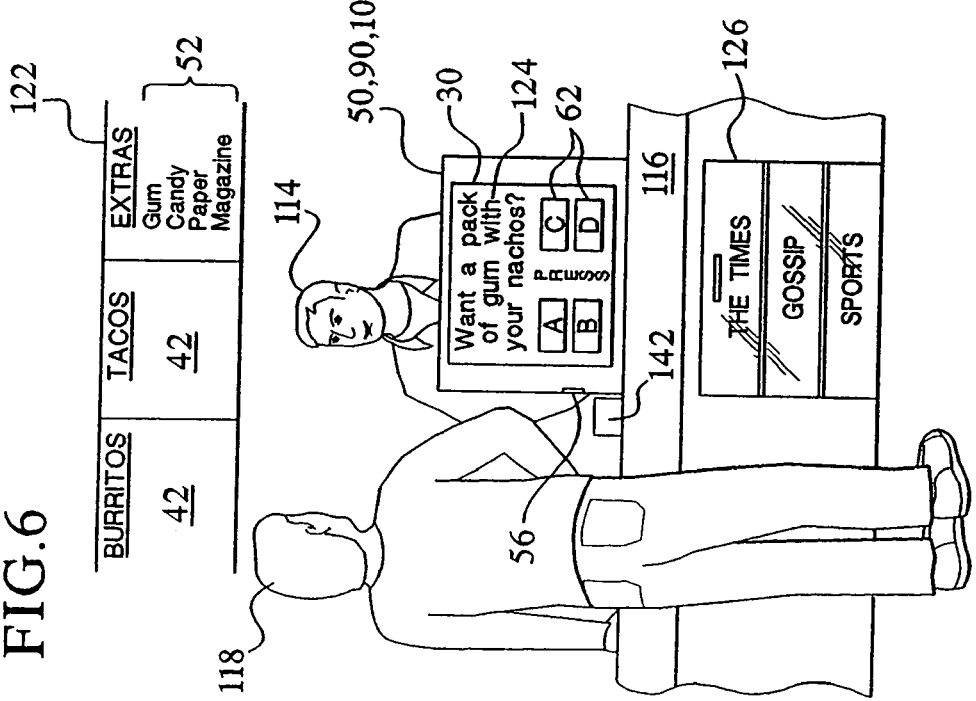

RF POINT OF PURCHASE APPARATUS AND METHOD OF USING SAME

PRIORITY CLAIM

This application is a continuation-in-part of the U.S. application Ser. No. 09/960,915 filed on Sep. 21, 2001 which claims the benefit of U.S. Provisional Patent Application No. 60/261,512, filed Jan. 12, 2001, the disclosures of all of which are incorporated herein by reference.

BACKGROUND OF THE INVENTION

Automated purchasing machines are becoming more and more prolific. Consumers have come to rely on the convenience and speed of automated teller machines ("ATMs") for banking. Equally important, consumers have come to trust the security of electronic funds transfers. This speed, convenience and goodwill are beginning to be implemented in automated purchasing machines. Not surprisingly, gas stations, grocery stores, fast food restaurants, movie theaters, airports as well as other retail outlets have added automated purchasing machines to their standard modes of conducting business. Given their advantages, and as people become more accustomed to them, automated purchasing machines are likely to continue to proliferate.

There are a number of advantages inherent in automated purchasing machines. First, automated machines are convenient and reduce waiting time. For instance, the automated fuel pump enables the consumer to fill the vehicle and complete the transaction without having to leave the area around the vehicle. Second, automated machines offer additional payment options. For instance, many grocery store checkouts have card readers that enable the consumer to pay for groceries from a bank account or by credit. Third, the automated machines reduce labor. ATMs, for instance, allow banks to reduce the number of live tellers. Fourth, automated machines increase throughput. Automated fuel pumps, for example, reduce the amount of idle time that cars spend next to the pump.

A new entry into the world of automated purchasing machines is the self-scanning checkout, which has been implemented in various grocery stores and supermarkets. Self-scanning checkouts enable shoppers to scan, bag and pay for items with little or no assistance from store personnel. A consumer enters a grocery store and selects items for purchase in the conventional manner. Instead of approaching a standard checkout manned by a cashier, the consumer approaches a bank of automated self-scanning checkouts, wherein a single cashier oversees the operation of the bank of machines. Consumers scan their own items and pay for the items by entering a check, credit card, debit card or cash into the machine.

One problem associated with automated purchasing machines is that they can negatively impact point of sale purchases. For example, before the automated fuel pump, the consumer had to enter a convenience store or a store associated with the gas station. Although an inconvenience to the consumer, the mandatory visit to the store for payment (the old point of purchase) encouraged the impulse purchase of confectionery items, such as gum, candy, soft drinks, etc., and non-consumable items, such as magazines and newspapers. The automated fuel pump has moved the point of purchase to the filling station, where point of purchase products are not displayed or advertised.

In grocery stores and supermarkets, the self-scanning checkout also stands to reduce point of purchase sales for a couple of reasons. First, the consumer is preoccupied with scanning products and does not have as much free time to peruse and select a point of purchase product. Second, one primary advantage that self-scanning checkouts provide to the grocery store or supermarket is reduced floor space. For example, four self-scanning checkouts require approximately seventy-five percent of the space that four standard checkouts require. Rack space normally associated with standard checkouts, and which displays point of purchase products, is likewise reduced. Self-scanning checkouts stand to reduce the height, width and number of racks at grocery and supermarket checkout lines. Less rack space necessarily dictates less exposure for the point of purchase products.

A need generally exists for sellers of point of purchase products to capitalize on the growing proliferation of automated purchasing devices. As the point of purchase in a variety of retail areas increasingly moves away from a checkout counter to an automated purchasing machine, a need exists to provide an apparatus and method of displaying and supplying point of purchase products at the new point of purchase.

In particular, a need exists to provide an apparatus and method for displaying and providing point of purchase products in combination with self-scanning checkouts at grocery stores and supermarkets.

SUMMARY OF THE INVENTION

The present invention provides apparatuses and methods that improve upon the sale of point of purchase products. For example, apparatus are provided wherein point of purchase product can be automatically dispensed. Additionally, apparatus and materials are provided that automate the purchase of point of purchase products.

To this end, in an embodiment the present invention enables point of purchase products to be dispensed as the consumer purchases other retail items that a consumer collects and brings to the point of purchase. The point of purchase product is immediately dispensed and provided to the consumer at the point of purchase. The cost of the dispensed product is added to the cost of the other retail items. The consumer makes one payment for both the dispensed product and the other retail items.

In an embodiment, a device is provided that allows a consumer to purchase products without the need for a cashier. The device includes a body that defines an interior. The device includes a controller. The controller couples to and communicates with a scanning device. The scanning device allows a consumer to scan purchasable items that the consumer brings to the device and to accumulate a cost for the items. The body maintains a dispensable product and includes a dispenser that dispenses the product from the body upon a request for the product by the consumer. The controller adds a cost for the product to the cost for the items.

In an embodiment, the body houses the controller.

In an embodiment, the controller is electrically coupled to the body.

In an embodiment, the scanning device is electrically coupled to the controller.

In an embodiment, the scanning device is optically coupled to the controller.

In an embodiment, the scanning device is integral with the controller.

In an embodiment, the purchasing device includes a display that prompts the consumer to purchase the product.

In an embodiment, the purchasing device includes a plurality of different products and the controller communicates a selected product to the dispenser. The different products may be for example: confectionery products, periodicals, cigarette lighters, batteries, key chains, writing instruments, film; toiletries or toys.

In an embodiment, a stand-alone point of purchase device that operates with an automated purchasing device is provided. The automated purchasing device has a controller that allows a consumer to scan purchasable items and accumulate a cost for the items. The point of purchase device includes a body housing a product. The point of purchase device includes a member for coupling to the automated purchasing device. The point of purchase device also includes a dispenser that dispenses the product from the housing upon request by the consumer. The cost for the product is added to the cost for the items.

In an embodiment, a point of purchase device that operates with an automated purchasing device is provided. The point of purchase device includes a body that houses a product. The point of purchase includes a controller coupled to the body. The point of purchase device also includes a dispenser that dispenses the product from the body upon a signal from the controller. The consumer initiates the signal. Afterward, a cost for the product is added to the cost for the items that the consumer purchases.

In an embodiment, a point of purchase device that operates with an automated purchasing device is provided. The automated purchasing device allows a retail operator to input purchasable items and accumulate a cost for the purchasable items. The point of purchase device includes a dispenser that dispenses a product from a stock upon a signal from a controller. A retail operator initiates the signal. A cost for the product is automatically added to the cost of the purchasable items.

In an embodiment, the automated purchasing device is a scanner.

In an embodiment, the automated purchasing device is a cash register.

In an embodiment, a point of purchase device is coupled to a device that allows a retail operator to input purchasable is provided. The point of purchase device includes a body housing a stock of product. A controller is maintained within the body. The body also includes a dispenser that dispenses a product from the stock upon a signal from the controller. The retail operator initiates the signal. A cost for the product is added to the cost for the purchasable items.

In an embodiment, a point of purchase device that operates a credit/debit card verification device is provided. The credit/debit card verification device authorizes a cost for items purchased by a consumer. The point of purchase device includes a controller that communicates with the credit/debit card verification device. The controller couples to a dispenser that dispenses a consumable product upon a signal to the controller. The consumer initiates the signal through the credit/debit card verification device. A cost for the consumable product is added to the cost for the items purchased by the consumer.

In an embodiment, the credit/debit card verification device is located at a retail checkout line.

In an embodiment, a point of purchase device is provided. The point of purchase device includes a body housing a stock of product. The body is physically coupled to a discrete automated purchasing device. The automated purchasing device allows consumers to automatically purchase items that the consumers physically bring to the automated purchasing device. The point of purchase device includes a money acceptor coupled to the body. The body houses a dispenser that dispenses a product from the stock upon a consumer's input of a predefined amount of money into the money acceptor.

In an embodiment, the automated purchasing device is located at a retail outlet, which may be: a retail checkout, a restaurant cash register or an electronic ticketing station.

In an embodiment, the money acceptor is selected from: a cash acceptor, a coin acceptor or a credit/debit card acceptor.

In an embodiment, a device for dispensing consumable and non-consumable products is provided. The device includes a body. The body houses a stock of a consumable product. The body also houses a stock of a non-consumable product. The device includes a dispenser that dispenses the consumable product. The device further includes an apparatus that totals purchase prices for consumable and non-consumable products. The device also includes a payment acceptor that allows the consumer to make a single payment for the consumable and non-consumable products.

In an embodiment, the non-consumable product may be movie tickets, air plane tickets, periodicals, video tapes, CDs, DVDs and newspapers.

In an embodiment, a method of operating an automated checkout is provided. In the method, a consumer is allowed to bring purchasable items to an automated checkout device. The consumer is allowed to scan the purchasable items and accumulate a cost for the scanned items on a display. The consumer is allowed to purchase a product from a dispensing device located in juxtaposition to the automated checkout. The method includes dispensing the product from the dispensing device and adding a cost of the product to the total cost for the scanned items on the display.

In an embodiment, a method of operating a checkout station is provided. In the method, a consumer is allowed to bring purchasable items to a store operator. The operator is allowed to scan the purchasable items and accumulate a cost for the scanned items. The consumer is allowed to independently purchase a product from a dispensing device. The method includes dispensing the product from the dispensing device and automatically adding a cost of the dispensed product to the cost for the scanned items.

In an embodiment, a method of operating a device for inputting purchases is provided. The method includes employing an operator to input purchasable items into a cash register and accumulate a cost for the inputted items. The consumer is allowed to purchase a product from a dispensing device. The product is dispensed from the dispensing device a cost of the product is to the cost for the inputted items.

In an embodiment, a method for providing a point of purchase product without the need for a cashier is provided. In the method, a product is provided at the point of purchase. A cost associated with other items purchased by a consumer is accumulated. The consumer is informed that the product is available at the point of purchase. The product is dispensed to the consumer at the point of purchase upon an approval by the consumer to purchase the product. Any additional cost for the product is added to the cost associated with other items purchased.

In an embodiment, the method includes accepting a single payment in exchange for the product and other purchased items.

In an embodiment, informing the consumer that the product is available includes displaying an advertisement for the product.

In an embodiment, informing the consumer that the product is available includes prompting the consumer concurrently with the purchase of the other items.

In an embodiment, the method includes allowing a retail operator to enter the consumer's approval to purchase the product.

In an embodiment, the method includes allowing the consumer to enter the approval to purchase the product.

In an embodiment, a method for providing different products at a point-of purchase is provided. In the method, a plurality of different products are stocked at the point of purchase. Costs associated with other consumable items purchased by a consumer are accumulated. The consumer is automatically informed that the products are available at the point of purchase. The method includes automatically accepting an approval by the consumer to purchase at least one of the products. The method includes automatically dispensing the at least one the product to the consumer at the point of purchase and automatically incrementing any accumulated cost by the cost of the at least one product.

In an embodiment, informing the consumer that the products are available includes displaying a dynamic display that changes to show the different products.

In an embodiment, a method for providing consumable and non-consumable products is provided. In the method, consumable and non-consumable products are stocked in a single device. A consumer is allowed to purchase a consumable product from the single device without the need for a cashier. The consumer is allowed to purchase a non-consumable product from the single device without the need for a cashier. The consumer is allowed to pay for the consumable and non-consumable products without the need for cash.

In an embodiment, the consumer is allowed to pay for the consumable and non-consumable product at one time.

In an embodiment, a method of funding a retail purchasing device is provided. In the method a point of purchase device is provided that operates with the retail purchasing device. A fee is paid from a provider of a product in exchange for allowing the product to be dispensed from the point of purchase device.

In an embodiment the retail purchasing device may be: a self-scanning purchasing device, a fuel dispensing gasoline pump, a debit/credit card reader or a cash register.

In an embodiment the provider may be a manufacturer of the product or a distributor of the product.

In an embodiment, a method for purchasing items is provided. In the method, a plurality of items are transported to a checkout station. A device that identifies costs for the items is used to create a purchase price for the plurality of items. A consumer is prompted to purchase a point of purchase product. A dispenser dispenses the point of purchase product. The cost of the point of purchase product is automatically, without the need for a human operator, added to the purchase price.

In an embodiment, the cost of the point of purchase product is added to the purchase price before the cost of all of the plurality of items is totaled.

In an embodiment, the device that identifies costs is an optical scanner.

In an embodiment, the point of purchase product is dispensed from a device that is integral with the device that identifies costs.

In an embodiment a system for providing point of purchase products is provided. The system includes a device for identifying costs of items and creating a purchase price for the items. The system has means for prompting a consumer to purchase a point of purchase product. The system also includes a device and dispenser for dispensing the point of purchase product upon request from the consumer. The device also adds a cost of the point of purchase product to the purchase price.

In an embodiment, the means for prompting is an advertisement.

In an embodiment, the device for identifying is a scanner.

In an embodiment, the means for prompting is a credit/debit card device.

In an embodiment, the system includes a device for accepting payment for a total purchase price. The total purchase price includes the cost of the point of purchase product and the purchase price for the items.

In an embodiment, the means for prompting is part of the device and dispenser.

In an embodiment, the purchase price for the items is a total purchase price which occurs when the device for identifying has identified all of the items.

In an embodiment, a device for dispensing a retail item is provided. The device includes a retail customer terminal located proximate a point of purchase location. The retail customer terminal has an input device that permits selection of a purchasable item and a point of purchase product. A retail item processor electrically communicates with the retail customer terminal and processes consumer selections of the purchasable items and the point of purchase products. A dispensing terminal is located proximate the point of purchase location and electrically communicates with the retail customer terminal and the retail item processor. The dispensing terminal handles and dispenses the point of purchase product from a storage location to a dispensing location when the consumer selects the point of purchase product.

In an embodiment, the dispensing terminal is further adapted to handle and dispense at least one coin as change for the retail consumer.

In an embodiment, a retail item dispensing device is provided. The device includes a receptacle that houses and ejects a point of purchase product stored inside the device. A dispensing location is located proximate a point of purchase location for a purchasable item that the consumer brings to the point of purchase. The dispensing location has a surface that carries the point of purchase product. The retail item dispensing device includes a customer selection input device that inputs the customer's selection of a purchasable item and a point of purchase product. The input device is located proximate the point of purchase location. The retail item dispensing device includes a retail item processor that electrically communicates with the input device and the receptacle. A dispensing device is also included and is configured to deliver the point of purchase product ejected from the receptacle to the dispensing location proximate the point of purchase location.

In an embodiment, the checkout device includes a purchasable item having a Radio Frequency Identification (RFID) member, e.g., tag, affixed thereto and a scanner for detecting the RFID tag. A dispenser proximate to the scanner dispenses a point of purchase product upon selection by a user of the checkout device. A controller in operative communication with the scanner and the dispenser subsequently calculates the cost of the purchase item and the point of purchase product. In an embodiment, a display device in operative communication with the controller displays the cost to the person using the checkout device.

In an embodiment, a method for purchasing items is provided. The method includes providing a checkout device having a scanner proximate to a dispensing device that dispenses a point of purchase product, detecting a purchasable item having an RFID tag with the scanner, and dispensing a point of purchase product from the dispenser. The checkout device then calculates the cost of the detected purchasable item and the dispensed point of purchase product. The checkout device may also include a display device that displays the cost to a user using the checkout device.

In a further embodiment of the present invention, a method of purchasing items from a checkout device is provided which includes detecting a purchasable product having an RFID tag with a scanner, and offering a consumer a point of purchase product from a dispenser located proximate to the scanner. Responsive to a selection by the consumer, the dispenser dispenses the point of purchase product and the device calculates the cost of the detected purchasable item and the selected point of purchase item.

It is therefore an advantage of the present invention to provide point of purchase products.

It is another advantage of the present invention to provide point of purchase products in combination with retail items that the consumer retrieves and brings to the point of purchase.

It is a further advantage of the present invention to provide point of purchase products in combination with retail items and accumulate the cost for both.

Moreover, it is an advantage of the present invention to enable the consumer to make one payment for point of purchase products and retail items retrieved by the consumer.

Further, it is an advantage of the present invention to provide a point of purchase device that prompts the consumer to purchase point of purchase products.

Further still, it is an advantage of the present invention to provide a point of purchase device having a smart prompt capability that prompts the consumer to purchase and have dispensed certain products based on the items that the consumer has brought to the point of purchase.

Still further, it is an advantage of the present invention to provide a point of purchase device having a smart prompt capability that prompts the consumer to purchase and have dispensed certain products based on a profile for the consumer.

It is yet another advantage of the present invention to provide a device that enables a point of purchase product supplier to advertise point of purchase products.

It is likewise an advantage of the present invention to provide a device that enables different suppliers to purchase different proportions of advertising space and/or time on the point of purchase product.

It is again an advantage of the present invention to provide a device that enables different suppliers to change an advertisement in real time from a remote location.

It is yet another advantage to provide a point of purchase device, which requires little space and couples to a device for inputting costs of items that are brought to the point of purchase.

It is still a further advantage to provide a point of purchase device, which physically integrates into existing retail checkout settings and is readily implemented by retailers and used by consumers.

Further still, it is an advantage to provide a modular point of purchase device, which couples to but does not affect the integrity of a device for automatically detecting the cost of items that are brought to the point of purchase.

Additionally, it is an advantage of the present invention to provide a modular point of purchase device, which couples to but does not adversely affect the process flow of a retail checkout device.

Additionally, it is another advantage of the present invention to provide a modular point of purchase device that dispenses a product into a bag containing other items or into a convenient tray, whereby the retailer or consumer can readily obtain the product.

It is an advantage of the present invention to provide a point of purchase device that can be coupled to an RFID checkout station.

It is another advantage of the present invention to provide a point of purchase device that can be operated in a retail setting.

It is a further advantage of the present invention to provide a point of purchase device that can be coupled to a retail item cash register.

It is still another advantage of the present to provide a point of purchase device that can be coupled to a credit/debit card reader.

Moreover, a further advantage of the present invention to provide a single device that dispenses consumable and non-consumable products.

Another advantage of the present invention to provide an RFID checkout having integrated point of purchase products and a dispenser therefore.

Still further, it is an advantage of the present invention to provide a point of purchase device that performs inventory management for one or more products dispensed by the device.

Additionally, it is an advantage of the present invention to provide a point of purchase device that transmits real time data to one or more suppliers of products dispensed by the device.

Yet additionally, it is an advantage of the present invention to combine a point of purchase device with a change-making dispensing device.

It is yet a further advantage of the present invention to provide a method of funding automated purchasing devices.

Moreover, an advantage of the present invention is to provide a point of purchase device for use with a variety of RFID checkouts.

Additional features and advantages of the present invention are described in, and will be apparent from, the following Detailed Description of the Invention and the figures.

BRIEF DESCRIPTION OF THE FIGURES

FIGS. 6 and 7 illustrate stand-alone point of purchase devices in a quick service restaurant environment.

DETAILED DESCRIPTION OF THE INVENTION

Figure 1:
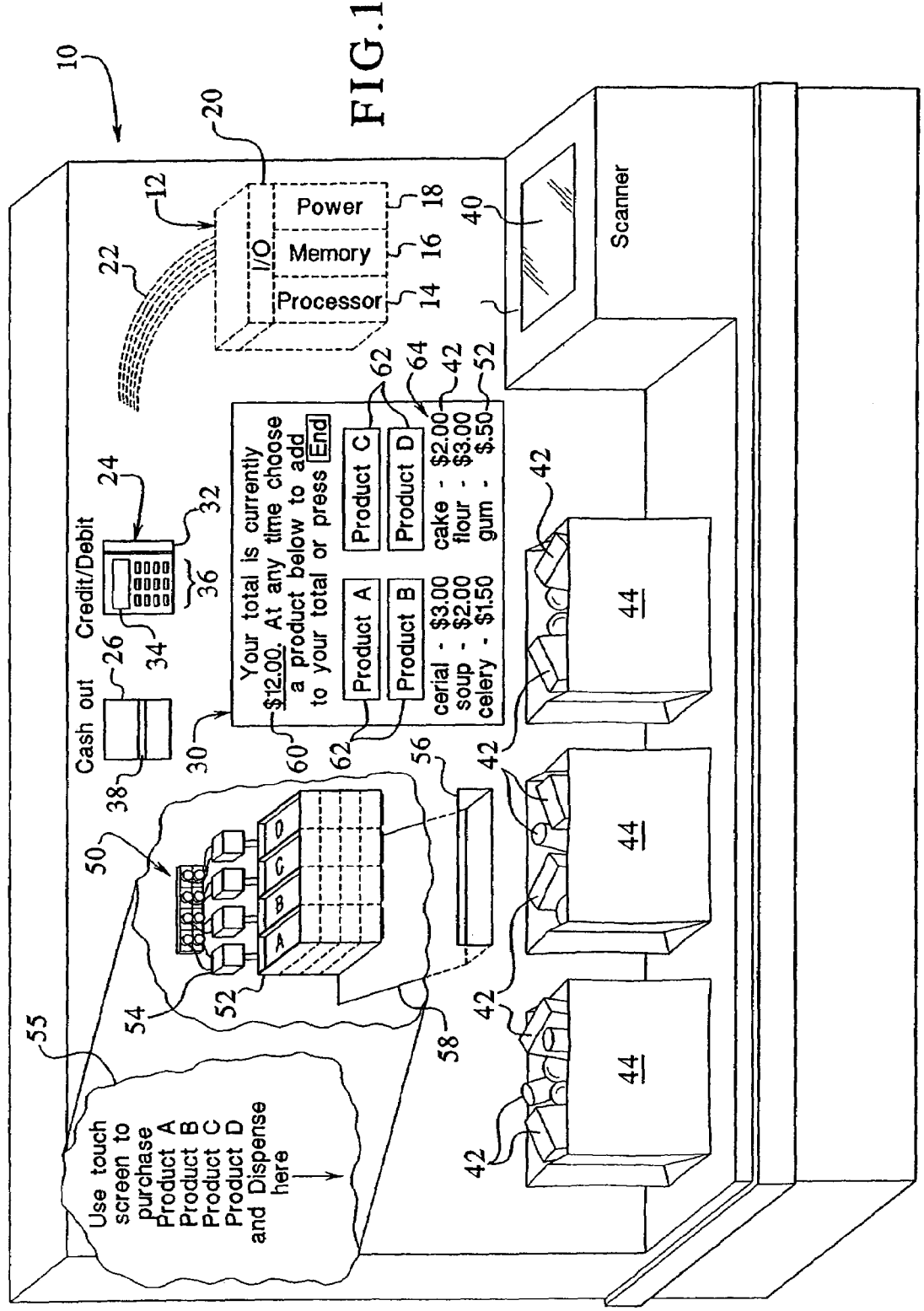
FIG. 1 illustrates a self-scanning purchasing device that is adapted to dispense a point of purchase product.

Self-scanning checkouts are beginning to proliferate in supermarkets and grocery stores. Current self-scanning checkouts stand to reduce point of purchase sales because: (i) the consumer is preoccupied with scanning products and does not have as much free time to peruse and select a point of purchase product; (ii) the amount of floor space available for standard point of purchase racks is reduced; and (iii) the architecture of current popular self-scanning checkouts requires that the height of the standard racks be reduced.

With current self-scanning checkouts, the consumer actively accumulates a cost for items brought to the point of purchase. That is, instead of standing in line and looking at a rack full of point of purchase products while a cashier enters the cost of the consumer's items, the consumer at the self-scanning checkout pulls items out of a shopping cart or other storage area, individually scans each item, checks a video monitor to ensure that the right items and the right prices are being accumulated, bags the scanned items and pays for the items. In short, the consumer has a lot less time to look at currently displayed point of purchase products and, equally importantly, may not remember to do so.

The available space problem for point of purchase products at current self-scanning checkouts is twofold. First, there is less available space. Second, the space that is available is not located specifically at the point of the customer's focus. That is, the racks must be placed on either side of, or otherwise separately from, the current scanner, the current monitor, the current payment acceptor and the current bagging area, i.e., away from the consumer's focus.

The reduced rack space means that there will be a higher level of competition between suppliers of point of purchase products. Retailers that use self-scanning checkouts are carefully selecting products for the available rack space, which is now at an even higher premium. It is likely that high-velocity, high-margin products will take the lion's share of available space because retailers cannot afford to risk stocking a loser or even a mid-level performer. The result has been and will continue to be a decline in new product offerings.

Both the product supplier and the retailer will suffer from reduced sales of point of purchase products. Brand recognition will begin to erode and the retailer will lose the additional sale. Retailers are thus currently forced to decide between providing the efficiency associated with self-scanning checkouts or holding on to the point of purchase sale.

Quick service restaurants ("QSRs") provide a similar but slightly different challenge. QSRs also have limited floor space for point of purchase products. Counter space at the QSR is limited and requires free access to process a fast food transaction. The floor space in front of the counter needs to be open for lines to form and for the consumer to choose food items. Placing a standard point of purchase product rack in the middle of a fast food floor and requiring the consumer to bring a point of purchase product to the counter simply does not integrate well with an over the counter fast food transaction.

Many QSRs are also experiencing quality labor shortages. QSRs tend to have high employee turnover and training costs. Product shrinkage is also an issue with QSRs. QSRs are therefore looking at a number of technologies to alleviate their limited space and labor issues, increase operational efficiencies and mitigate product shrinkage. One known solution is a point of sale kiosk that eliminates the conventional cash register. Another solution is a "speedpass" payment system in which a "wand" is provided to the consumer. The wand operates on a radio frequency ("RF") to send fast food transaction information to a credit/debit card account. The speedpass system is compact, requires little counter space and no floor space and is operationally faster and transactionally more efficient than the conventional "QSR" transaction.

The challenge that QSRs present to point of purchase product suppliers is to provide a solution that works with the conventional, e.g., cash register, system and any alternative primary fast food item purchasing system. The point of purchase system, in any event, preferably: (i) is convenient for the consumer and the fast food employee to use; (ii) does not increase or significantly increase labor costs; (iii) requires little counter space and little or no floor space; (iv) reduces product shrinkage; (v) integrates with any primary fast food item purchasing system; and (vi) assists in inventory management by providing point of purchase inventory data to the system.

Referring now to the drawings and in particular to FIG. 1, an embodiment of the present invention is illustrated. As illustrated, a self-scanning purchasing device 10 is provided. Typical self-scanning checkouts are known and are available, for example, from NCR Corp. and Optimal Robotics Corp. The self-scanning checkout 10 includes a controller 12. The controller 12 includes a processor 14, a memory device 16 and a power supply 18. The processor 14 in one embodiment is a Pentium™ processor, which runs Windows NT™ software. The memory device 16 runs a program that interfaces peripheral devices connected to the controller 12 with human operation.

The controller 12 includes an input/output ("I/O") card or module 20 to which a plurality of wires 22 (e.g., in the form of a ribbon cable or other wire bunching technique) connect. The wires 22 run to various peripheral devices. The peripheral devices typically include a credit/debit card reader 24, a cash dispenser 26, a scanning device 28, and a display device having an associated touch screen interface ("touch screen display 30"). In addition, RS-232 or RS-485 cables may run from the controller 12 to these devices, in the event that they have their own processing capability. The scanning device 28 in an embodiment may also be adapted to optically couple to the controller 12. The controller 12 also includes a video graphics card or module (not illustrated) and may also include a sound card.

The credit/debit card reader 24 enables a consumer to select to pay by credit card or debit card. The card reader 24 includes an insert slot 32 a card reader display 34 and a plurality of numerical input buttons 36. If, after inserting a card into the slot 32, the reader 24 cannot read the card number, the consumer can key in the card number using the numerical input buttons 36.

Either the touch screen display 30 or the numerical input buttons 36 may be adapted to allow the consumer to enter an amount of money. The self-scanning checkout 10 will in turn dispense the amount of money from the cash dispenser 26. The cash dispenser 26 includes one or more dispensing slots 38 that dispense the cash and a receipt for the transaction.

The scanning device or scanner 28 has a transparent cover 40 and electronics behind the cover 40 that reads a barcode placed on the majority of purchasable items 42 found in a supermarket, convenience store or other retail outlet. As the consumer scans an item past the cover 40, the touch screen display 30 displays or acknowledges the item and displays its price. In an embodiment, an automated voice instructs the consumer to place the item 42 into a bag 44. After the consumer scans multiple items, the touch screen display 30 shows a scrolling list of items, their prices, and a total price, i.e., a virtual receipt.

The self-scanning checkout 10 in an embodiment employs a video camera (not illustrated) to identify produce and other non-bar coded items 42. Once the consumer scans and bags all the purchasable items 42, the consumer selects a card payment method using the credit/debit card reader 24. The purchasing device 10 also allows the consumer to pay by cash, check and/or food stamps via a bill acceptor (not illustrated). The self-scanning checkout 10 dispenses change in the form of cash from the cash dispenser 26 and coin change from a coin dispenser (not illustrated). The self-scanning checkout 10 prints a receipt that shows the list of items 42 appearing on the touch screen display 30. The cash dispenser 26 may be adapted to issue the receipt, or alternatively, a separate outlet (not illustrated) that issues the receipt from a receipt printer (not illustrated) may be provided.

Figure 10:
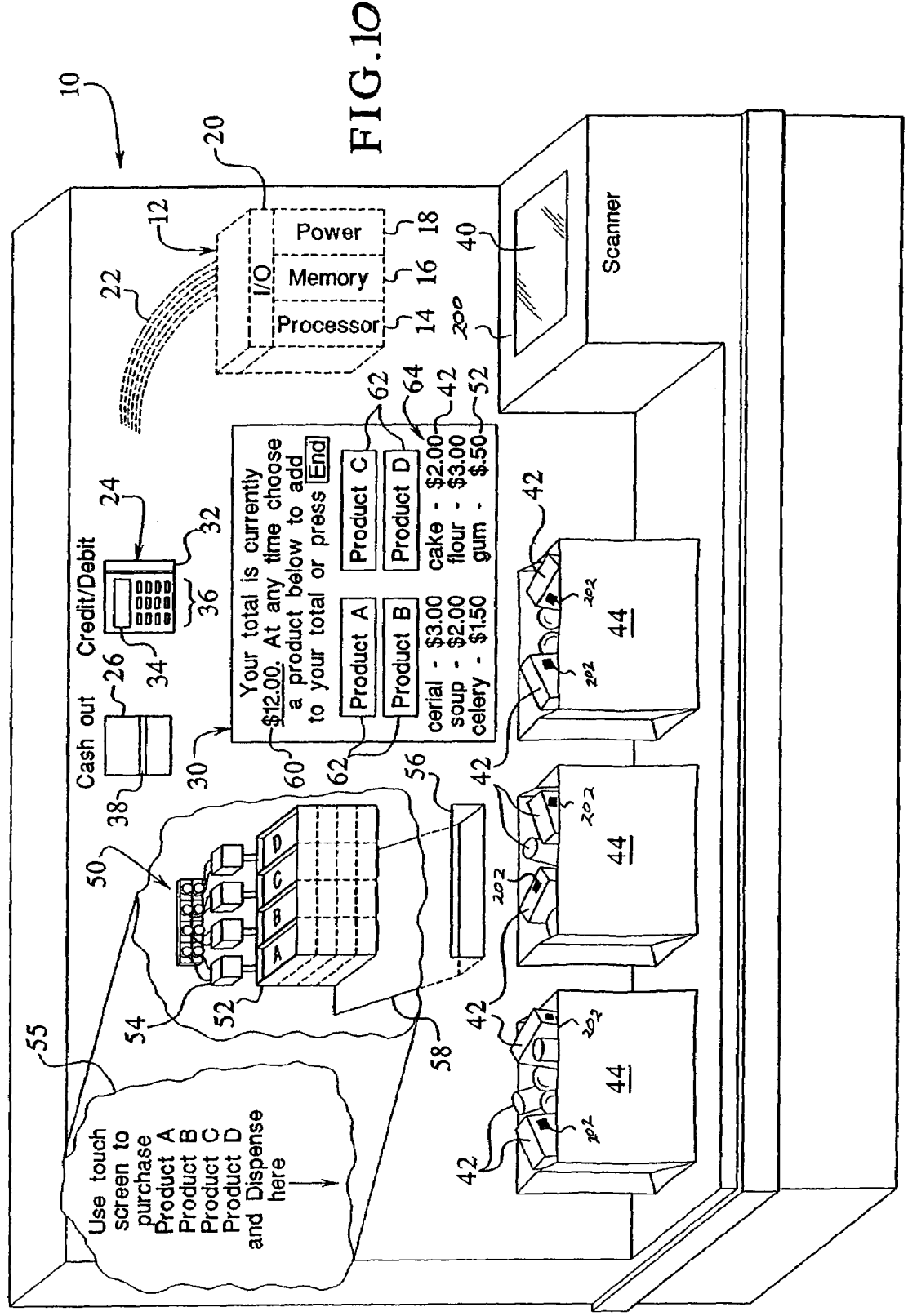
FIG. 10 illustrates a further embodiment of a purchasing device that detects purchasable items having RFID tags attached thereto and is adapted to dispense a point of purchase products.

In an embodiment, purchasing device 10 may include other ways of automatically inputting costs of the product, or means for assisting in inputting costs. For example, the purchasable item 42 may have a radio frequency identification tag 202 affixed thereto, a scanner 200 for detecting the RFID tag, dispenser 54 proximate to scanner 200 for dispensing point of purchase product 52, and controller 12 in operative communication with scanner 200 and dispenser 54 for calculating the cost of the purchase item and the point of purchase product. In this embodiment, scanner 200 may utilize radio frequency (RF) detection to identify the purchasable items. As shown in FIG. 10, a scanner 200 may be used to detect radio frequency identification (RFID) tags 202 affixed or otherwise attached to purchasable items 42. As used herein, an RFID tag is a device capable of receiving, storing and transmitting information as is commonly known in the art. Although the word "tag" is used, it can include any member that can transmit or produce a radio frequency that can identify the product and/or its costs. The RFID tag 202 may include an antenna, circuitry for processing RF signals, a microprocessor, memory, and, optionally, a power supply. RFID tag 202 may be preprogrammed with information such as the price of each item, the store shelf and aisle location of the purchasable item, inventory data such as supply source, quantity sold, quantity remaining, date of purchase, expiration date, location, purchase trend data and combinations thereof.

RFID tag 202 may be affixed to a surface of purchasable item 42 through a variety of means including an adhesive material or may be integral to the purchasable item packaging as is commonly known in the art. RFID tag 202 may be a passive device or an active device. As a passive device, an RFID tag transmits a signal only upon reception of an RF interrogation signal utilizing operating power generated from the RF interrogator. As an active device, an RFID tag is configured with its own power supply and thereby capable of transmitting a signal independently. Passive RFID tags are typically smaller and lighter than active RFID tags. In an embodiment, RFID tag 202 is a passive RFID device.

Scanner 200 may be an RF interrogator as is commonly known in the art. Scanner 200 may include an antenna, a transceiver for transmitting an interrogation signal to and receiving a response signal from the RFID tag, and a decoder for reading the encoded information in the signal from the RFID tag. Scanner 200 generates an electromagnetic field at a predetermined frequency. When RFID tag 202 enters the field, an electric current is induced providing power to RFID tag 202 and modulating the electromagnetic field to transmit the preprogrammed administration protocol data stored in the memory of RFID tag 202 back to scanner 200. Scanner 200 then decodes this data and transmits this data to controller 12.

Purchasing device 10 including scanner 200 and RFID tag 202 provides several advantages. A line-of-sight arrangement between RFID tag 202 and scanner 200 is not necessary for detection to occur. A person using scanner 200 (e.g., a consumer or a store attendant) need only place purchasable item 42 within the electromagnetic field generated by scanner 200 for detection to occur. Thus, detection of RFID tags 202 by scanner 200 enables a consumer or purchaser to checkout the items with relative ease. In addition, scanner 200 may be stationary or movable such as a hand-held scanner, for example.

Moreover, no contact between purchasable item 42 and scanner 200 is required for detection. This significantly reduces conditions that may otherwise be deleterious to proper detection of the signaling component. For example, moisture, fluid, dust, dirt, or any other physical impediment disposed upon the purchasable item and/or RFID tag 202 will have little or no impact on the proper detection of RFID tag 202 by scanner 200.

Dispenser 54 may be proximate or otherwise adjacent to scanner 200. In an embodiment, dispenser 54 is positioned to be in the field of view of a consumer or other user when using scanner 200 to checkout the purchasable items. In an embodiment, dispenser 54 dispenses point of purchase product 52 responsive to a user selection as described in detail below.

In a further embodiment, checkout device 10 may include a display device 30 in operative communication with controller 12. Display device 30 may be used to display information such as the identity of the purchasable item, the cost of the purchasable item, the identity of the point of purchase product, the cost of the point of purchase product, and combinations thereof.

Display device 30 may also be used to offer the person using checkout device 10 a point of purchase product 52. A prompt, such as button 62, may be used by a consumer or other user to select a desired point of purchase product. Upon selection, dispenser 54 dispenses the point of purchase product and controller 12 calculates the running cost of the detected purchasable items and the selected point of purchase products.

In an embodiment, container 44 for containing detected or otherwise accounted for purchasable items 42 may be placed adjacent dispenser 54 in order to receive the dispensed point of purchase product. Dispenser 54 thereby dispenses point of purchase product directly into the container.

Referring to FIG. 1, the illustrated self-scanning checkout 10 of the present invention includes a point of purchase device 50, preferably having a stock of product 52 and a dispenser 54. As used herein the term "point of purchase" refers to a location where a consumer pays for product or otherwise checks out of a store or other retail environment. A section 55 of the front panel of the self-scanning checkout 10 has been cutaway to illustrate that in an embodiment, the automated checkout 10 houses the point of purchase device 50. In other embodiments, discussed below, a stand-alone point of purchase device mounts outside of the self-scanning checkout 10.

In the illustrated embodiment, the stock of product 52 provides a choice of four products A to D. The stock may obviously include any number of different point of purchase products 52 including a single product 52. The point of purchase products 52 can be any uniform distribution or mix of front-end products distributed at or near a checkout line, cash register, point of purchase kiosk, speedpass station, touch screen input device or other type of vending device, such as an automated movie or airline ticket vending machine. Examples of point of purchase products include confectionery products, such as chewing gum or candy, magazines, toiletries, such as razors or small tissue packets, batteries, cigarette lighters, key chains, writing instruments, film, disposable cameras, video tapes, digital video disks (DVDs), small toys, etc.

The present invention solves a number of problems facing suppliers of these types of products. First, in retail outlets, products are typically displayed according to a set planagram. The planagrams are carefully constructed to attempt to display the products in an aesthetically pleasing and organized manner. Where point of purchase products are concerned, planagrams take on an even more important role because the consumer is distracted by the purchase of other items. Accordingly, certain product suppliers may be temporarily or permanently locked out of the front-end market because there is currently no place or there never will be a place in the planagram for the supplier's products. Since the point of purchase products 52 of the present invention are dispensed from a device and are advertised, in one preferred embodiment, on a dynamic display, there is no need for a planagram. Consequently, the present invention provides a more flexible front-end market.

Second, smaller suppliers may fall victim to "slotting," which effectively allows the larger suppliers to consume the limited point of purchase space. Without the need to satisfy a planagram, smaller suppliers can purchase available space or slots intermittently. As described in more detail below, the suppliers may also purchase intermediate advertising slots. The retail outlet can establish a system whereby suppliers of faster selling products pay less for one or more of the available slots. A small supplier with a fast moving product therefore has an inroad into the competitive front-end market.

The retail outlet, e.g., grocery store or supermarket can also work with the larger suppliers to optimize the throughput of the present invention. For instance, a particular large supplier may pay a premium to own or maintain a long-term lease on, e.g., thirty percent of the available front-end slots or space. The supplier is obligated and also desires to maximize the profitability and throughput of this thirty percent. Accordingly, the retail outlet lets the supplier manage its thirty percent and concentrates on optimizing the profitability and throughput of the remaining seventy percent by slotting quick selling and profitable point of purchase products 52. Obviously, the percentages may vary from this example and the retail outlet may obtain more than one owner or major leaseholder.

Figure 9:
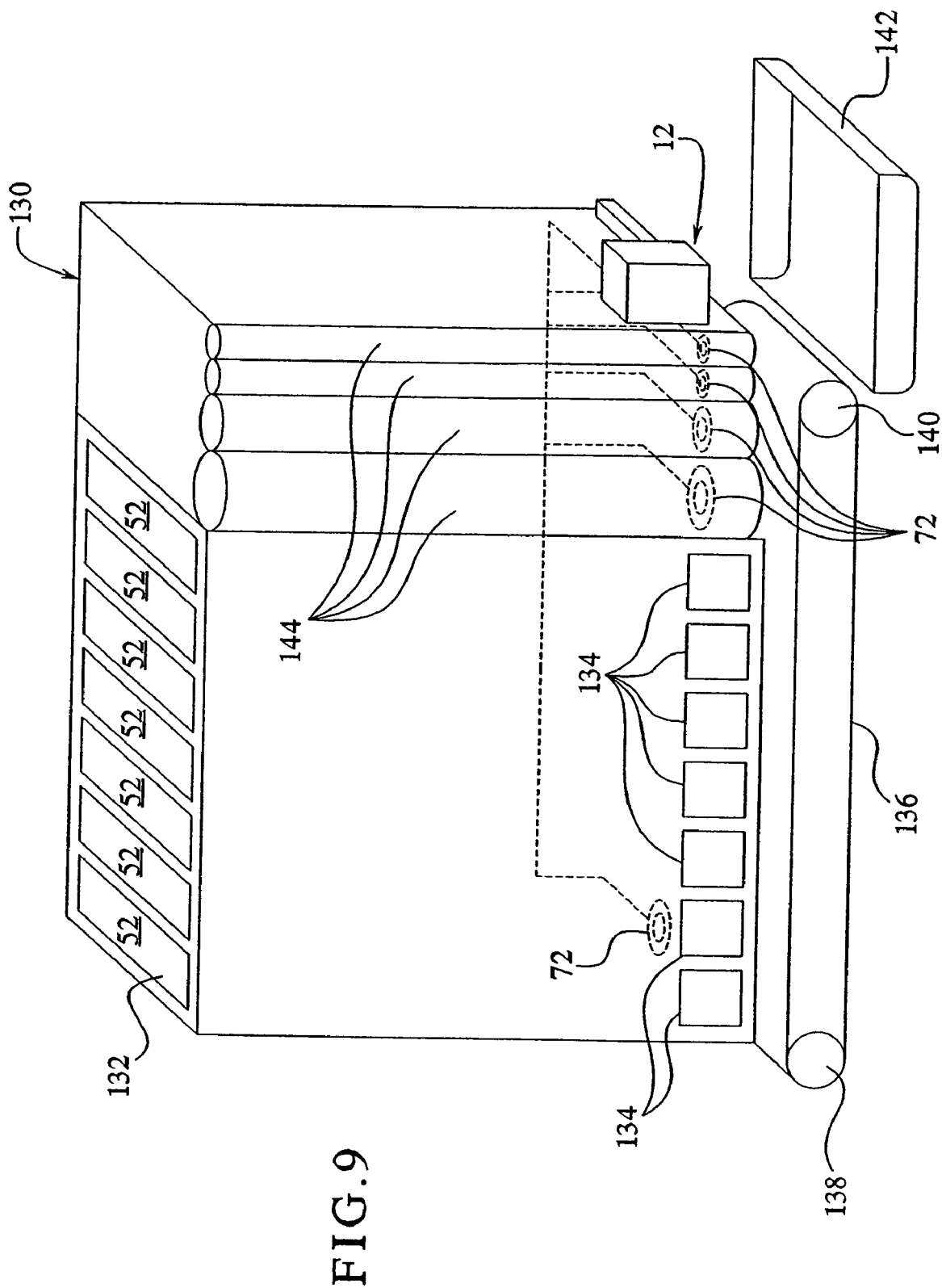
FIG. 9 illustrates still another embodiment of a standalone point of purchase device integrated with a coin change maker.

When the consumer desires to purchase one or more of the point of purchase products 52, the self-scanning checkout 10 dispenses the one or more products 52 through an opening 56 defined by a panel of the automated checkout 10. The opening 56 may in turn be juxtaposed above or near a product dispensing tray (FIG. 9). The opening 56 and tray in an embodiment also serve as the opening and tray of the coin change dispenser (FIG. 9). To direct the product 52 from the stocking point to the opening 56 or tray, the self-scanning checkout 10 provides one or more ramps or slides 58. Although the ramp or slide 58 is illustrated here as being completely housed within the device 10, a portion of or all of the ramp or slide 58 may be disposed on the exterior of the self-scanning checkout 10. The ramp or slide 58 may also include one or more conveying sections, such as a belt tensioned between rollers (FIG. 9).

In FIG. 1, the opening 56 dispenses one or more products 52 directly into one of the bags 44 of items 42 brought to the point of purchase. In another embodiment, the product 52 may be dispensed from any point on any exposed surface of the self-scanning checkout 10. For instance, a grocery store or supermarket may place the opening 56 (and possibly a tray) near the bill acceptor or cash out dispenser 26, near the credit/debit card reader 24, near the touch screen display 30 or near the scanner 28. Placing the dispenser near the payment devices, i.e., the bill acceptor or the credit/debit card reader 24 enables the consumer to retrieve a dispensed product 52 when paying for the items 42 and the product 52. Placing the dispenser near the touch screen display 30 enables the consumer to retrieve a dispensed product 52 directly after choosing to purchase the dispensed product 52. Placing the dispenser near the scanner 28 enables the consumer to retrieve a dispensed product 52 while handling the other items 42 brought to the point of purchase.

As illustrated, above or near the opening 56, the self-scanning checkout 10 provides advertising or information about the different products 52, illustrated here on the cutaway section 55. The advertisement informs the consumer to use the touch screen display 30 to automatically purchase one or more of the products A through D. The advertisement also points the consumer to where the automated checkout 10 will dispense the product, i.e., from the opening 56.

The dedicated advertising on the section 55 illustrates one embodiment for advertising different point of purchase products 52. In another embodiment, the advertising on the section 55 may be erasable or otherwise changeable to allow store operators or product distributors to load different products into the point of purchase device 50 and advertise such different products. In another embodiment, the touch screen display 30, or a different dynamic video display in communication with the controller 12, advertises the products A to D and may be adapted to delete or add one or more point of purchase products 52. In a further embodiment, and in particular where the stock includes many different products 52, the dynamic display may be adapted to scroll through the different products and display one or more but not all at once. A static or dynamic advertisement display may be mounted in various places on or near the point of purchase, such as on top of the self-scanning checkout 10 or in front of the automated checkout 10 (i.e., facing the consumer as the consumer approaches the checkout 10 from the grocery isles).

The touch screen display 30, as illustrated, currently provides a message 60, a plurality of simulated buttons 62 (one for each product A through D) and the running list 64 of purchased items 42 and dispensed products 52. The message 60 informs the consumer of the current total, and that the consumer may at any time during the transaction purchase one of the products A to D by selecting one of the buttons 62. In the illustrated embodiment, the touch screen display 30 provides a unique button 62 for each point of purchase product A to D. In another embodiment, the touch screen may be adapted to provide a toggle or "next" button (not illustrated), wherein the display 30 recalls and displays a new point of purchase product 52 each time the consumer presses the next button. In this embodiment, the touch screen display would also provide a select or "purchase" button, which would allow the consumer to sequentially purchase one or more displayed point of purchase products 52.

The running list 64 of the display 30 illustrates that the consumer has purchased a number of items 42, which the consumer has selected elsewhere within the supermarket or convenience store and has transported to the self-scanning checkout 10. The list 64 illustrates that the consumer has selected, transported and self-scanned cereal, soup, celery, cake mix and flour. The running list 64 also illustrates that the consumer has made a point of sale purchase, namely, the consumer has purchased gum, which is one of the products A through D. The consumer's current total of $12.00 illustrated by the message 60 includes the price of the point of purchase product 52, i.e., fifty cents. In one preferred embodiment, the present invention combines the cost of items 42 brought to the point of purchase and the products 52 purchased thereafter. In this way, the consumer pays cash and receives change once, writes one check or swipes a credit or debit card one time. The self-scanning checkout 10 therefore supplies and the consumer receives only one receipt.

In this illustrated embodiment, the consumer can select the same button 62 and purchase the same product 52 as many times as the consumer desires. The consumer can select as many different buttons 62 and purchase as many different products 52 (and as many different types of products 52) as the consumer desires. Each time the consumer presses a button 62, the dispenser 54 dispenses a single product 52. In an alternative embodiment, the touch screen display 30 provides a simulated numerical keypad and prompts the consumer to enter a quantity. If the consumer enters a quantity greater than one, the dispenser 54 dispenses the multitude of products 52 at once. It should be appreciated that any of the simulated input devices described herein, such as the buttons 62, the next and purchase buttons described above and the simulated keypad, may alternatively be provided as electromechanical input devices mounted to the panel of the automated checkout 10 and hard wired as discrete inputs into the I/O card or module 20, as is well known by those of skill in the art.

Figure 2:
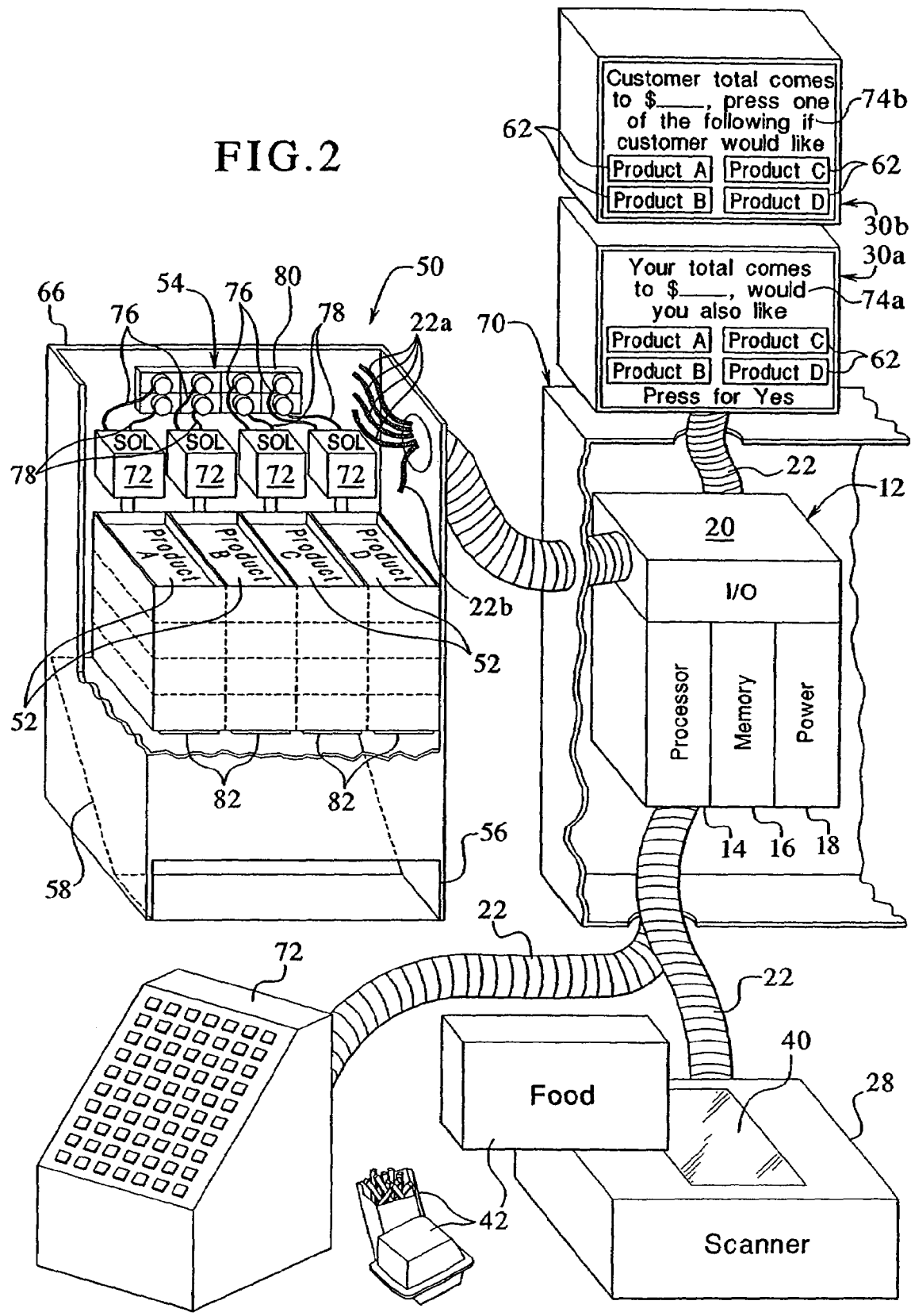
FIG. 2 illustrates an embodiment of a stand-alone point of purchase device of the present invention.

Referring now to FIG. 2, a second embodiment of the present invention provides a stand-alone point of purchase device 50, which is housed within a body 66 that is separate from an automated purchasing device 70. For purposes of the present invention, the automated purchasing device 70 is any device that accumulates a cost of items or accepts payment for items. In an embodiment, the automated purchasing device 70 is the self-scanning checkout 10 described in FIG. 1. The automated purchasing device 70 in another embodiment is any standard checkout device manned by a store operator. That is, the automated purchasing device 70 may be used in an employee operated purchasing line for any type of retail store, e.g., grocery store, fast food store, convenience store, drug store, hardware store, clothing store, superstore, etc., where the employee scans items or where the operator scans items using a scanner 40 or inputs selections into a cash register 72, point of purchase kiosk or touch screen input device. The automated purchasing device 70 also includes credit/debit card readers and bill acceptors. The automated purchasing device 70 further includes any type of device, such as the speed-pass, that bypasses the store operator and automatically sends a cost for one or items to a credit or debit account.

The stand-alone point of sale device 50 preferably mounts to or near the automated purchasing device 70 so that the device 50 is at the point of purchase. The automated purchasing device 70 includes the controller 12 having a processor 14, memory device 16, power supply 18 and I/O card or module 20. The automated purchasing device 70 may also include any other feature and apparatus described above in connection with FIG. 1, except that the point of sale device 50 is discrete.

The controller 12 electrically communicates with the scanner 28 via wires 22 and/or alternatively optically connects or connects by an RS-232 or RS-485 cable to the scanner 28. The controller 12 alternatively communicates with the scanner 28 via a radio frequency ("RF") signal, microwave signal, the Internet or via any other suitable communication link. When the automated purchasing device 70 is a self-scanning checkout 10 (FIG. 1), the consumer retrieves an item 42 from one of the store isles, brings the item to the scanner 28 and scans the item by passing it across the transparent cover 40. When the automated purchasing device 70 is an operator controlled checkout, the consumer retrieves an item 42 from one of the store isles, brings the item to the scanner 28, wherein the store operator scans the item by passing it across the transparent cover 40. In either case, the scanner 28 in one embodiment is a stand-alone scanner 28, as illustrated, and in another embodiment, the scanner 40 is a hand-held scanner that either the consumer or the operator holds so that a smaller transparent cover 40 of the hand-held scanner passes across the barcode of the purchasable item 42.

The controller 12 electrically communicates with the cash register 72 via wires 22 and/or via an RS-232 or RS-485 connection. The controller 12 alternatively communicates with the cash register 72 via an RF signal, microwave signal, the Internet or via any other suitable communication link. The controller 12 in an embodiment only couples to the scanner 28, in another embodiment only connects to the cash register 72 and in a further embodiment couples to both the scanner 28 and the cash register 72.

When the controller 12 couples to the cash register 72, a store operator mans the cash register 72. In certain retail operations, such as grocery stores, convenience stores, drug stores, hardware stores, clothing stores, superstores, the consumer retrieves an item 42, such as a box of food, from one of the store isles, and brings the item to the operator, who enters the item or price of the item into the cash register 72. In other retail operations, such as fast food restaurants or at will-call windows, the consumer approaches the operator and orders purchasable items 42, such as hamburger and fries, wherein the operator enters the item or price of the item into the cash register 72.

The controller 12 also communicates with one of the touch screen displays 30a or 30b. Here, the displays 30a and 30b are shown as being mounted on the exterior of the automated purchasing device 70. Although two touch screen displays are illustrated, only one is necessary as described above. The display 30a is adapted for when the consumer scans the items 42, i.e., at a self-scanning checkout (FIG. 1). Here, the display 30a provides a suitable message 74a that prompts the consumer, after the consumer has scanned all the purchasable items 42, whether the consumer wishes to purchase one of the point of purchase products 52, namely, products A to D. The display 30a also provides simulated buttons 62. In FIG. 1, the touch screen display 30 enabled the consumer at any point during the self-scanning process to select one or more of the buttons 62. The touch screen displays may be adapted to prompt the consumer to select a product 52 to immediately dispense before during or, as here, after the scanning sequence.

The display 30a may have any suitable message that prompts the consumer to purchase a dispensable product 52. For instance, the display 30a may be adapted to show the consumer the current total plus the cost for a dispensed product 52. For example, the display 30a might read, "Your total comes to $12.00. A pack of gum would add forty cents including tax. Press one below to dispense." The display 30a could also disclose a new total, e.g., "Your total comes to $12.00. A pack of gum would bring the total to $12.40 including tax. Press one below to dispense." Any of the messages or prompts disclosed herein may be visual, audio or audiovisual.

In any of the embodiments described herein, the memory 16 of the controller 12 may be adapted to store a computer program that enables the prompt to be a "smart prompt." That is, the software is configured to: (i) select a prompt based on one or more items 42 that the consumer has selected and transported to the point of purchase; (ii) select a prompt based on a customer profile obtained from the customer's grocery store card or from data collected by the controller; or (iii) select a prompt based on an algorithm that combines (i) and (ii). The processor 14 of the controller 12 operates with the computer program stored in the memory 16 to display a smart prompt on the display 30a or 30b.

When the smart prompt is based on the items 42 that the consumer has selected and transported to the point of purchase, the program in an embodiment looks for patterns or signals provided by the items 42. For instance, if the consumer collects and brings one or more items 42 to the point of purchase that are sugar free, fat free, low fat, have sugar substitutes, etc., the smart prompt may include a sugar free item, such as sugar free gum. In another example, if a number of desert-type items are brought to the point of purchase, the smart prompt may include candy, such as a candy bar. If the consumer has pulled a magazine from the store rack, the smart prompt may include another periodical. Obviously, those of skill in the art may adapt the software to perform many different types of analysis.

Grocery store or supermarket customer cards enable the store to compile data including the buying habits of the particular customer. The software may be adapted to use this information to display a smart prompt. For instance, if the customer card indicates that the consumer has purchased a number of sugar free or fat free items in the past, the smart prompt may include a sugar free item even if the consumer has not currently brought such an item to the point of purchase.

In another embodiment, a plurality of controllers 12 from different devices can link over a local area network ("LAN") to a server computer maintained within the grocery store or supermarket. The server computer stores buying habit information, which is compiled whenever the consumer pays by credit or debit card. A customer number may be internally assigned to the credit or debit card number, wherein information is stored under the customer number. Regardless of which standard checkout or self-scanning checkout the customer uses within the store, the server computer recognizes the credit/debit number, calls up the customer number and updates the buying habit information under the customer number. Further, regardless of which standard checkout or self-scanning checkout the customer uses, the software is able to access information stored by the server computer under the customer number to provide a smart prompt. If the user has purchased a particular product 52 at the point of sale in the past, for example, the smart message may include the previously purchased product 52.

In another embodiment, the customer card or server computer may be adapted to accumulate "customer points" and automatically dispense one or more point of purchase product 52 when the consumer's points reach a predefined threshold. Points may be issued for items 42 that the consumer brings to the point of purchase, for purchasing point of sale products 52, or both. In a quick service restaurant ("QSR"), points may be accumulated for fast food items purchased. The points can: (i) yield one or more free products; (ii) lead to an entry into a contest; and (iii) yield coupons for store items, point of purchase products or a contest entry, etc. The display 30 may be adapted to visually and/or audibly inform the consumer, e.g., "Congratulations, you've earned a free pack of gum."

The display 30b is adapted for when the store operator scans the items 42 using scanner 28 or inputs the items using the cash register 72. Here, the display 30b provides a suitable message 74b that prompts the store operator, after the operator has scanned or inputted all the purchasable items 42, to request whether the consumer wishes to purchase one of the point of purchase products 52, namely, products A to D. Alternatively, the operator may prompt the consumer before or while the operator scans or enters the consumer's selected items. The display 30b may also be adapted to prompt the store operator to quote the price of a dispensable product 52 or a new total that includes the price of the dispensable product 52. Further, the display 30b that prompts the store operator may contain a smart prompt configured based on the products purchased or a user profile.

The display 30b also provides the buttons 62, which the operator presses when the consumer wishes to have a point of purchase product 52 immediately dispensed. In either the consumer controlled or operator controlled embodiments, suitable advertisements in the form of a static or dynamic displays also inform the consumer of the availability of the point of purchase products.

In FIG. 2, the point of purchase device 50 has no control capability, i.e., is a dumb device, and completely relies on the controller 12 to command the dispenser 54 to dispense the products 52. The dispenser 54 may be any suitable type of dispenser for dispensing confectionery products such as chewing gum or candy, periodicals such as magazines, books or newspapers, toiletries such as razors or small tissue packets, batteries, cigarette lighters, key chains, writing instruments or small toys.

In the illustrated embodiment, the dispenser 54 includes a separate solenoid 72 for each product A to D. The solenoids 72 in an embodiment are push-type solenoids, each having a hot wire 76 and a neutral wire 78. Similarly, the wires 22 coming from the I/O card or module 20 of the controller include hot wires 22a and a neutral wire 22b. The hot wires 76 and neutral wires 78 of the solenoids 72 connect to a terminal strip 80, wherein the neutral wires are "jumpered" together. The neutral wire 22b from the I/O card or module 20 connects to one of the jumpered neutral terminals on the strip 80. The hot wires 22a from the I/O card or module 20 each individually connect to one of the hot wire terminals on the strip 80.

In this arrangement, when the consumer presses a button 62 on the screen 30a or the operator presses a button 62 on the screen 30b, an input signal is sent to the I/O card or module 20. Device software stored in the memory device 16 acknowledges the input and closes a designated output switch, which allows the power supply 18, rated for the solenoid voltage (e.g., 120 VAC or 24 VDC) to apply power across the corresponding hot wire 22a and neutral wire 22b. The powered up hot wire 22a and neutral wire 22b in turn apply power across the hot wire 76 and neutral wire 78 of the corresponding solenoid 72.

Applying power to one of the solenoids 72 causes an electrical to mechanical conversion to take place and a mechanical motion to occur, e.g., a lever to move from a first position to a second position. At this point any suitable mechanical linkage may be employed to dispense one or more of the point of purchase products 52. For ease of illustration, the dispenser is illustrated as having hinged or slideable doors 82 that open enough to allow one or more of the products A to D fall, due to gravity, onto the ramp or slide 58, wherein the product 52 dispenses through the opening 56. Obviously, those of skill in the art can and have devised other mechanical linkages, which may make more efficient use of the solenoids 72 or avoid them altogether. Importantly, however, in each implementation the initiation of a particular button 62 has a unique consequence in that it dispenses a specified amount of one of the products A, B, C or D.

It should be appreciated that since the stand-alone point of purchase device 50 of FIG. 2 has no control capability, the controller 12 accomplishes all the cost accounting. That is, the controller 12 maintains and recalls prices for the purchasable items 42, such as the food box or the fast food items, and the point of purchase products 52, such as chewing gum. The consumer controlled touch screen display 30a or the store operator controlled touch screen display 30b shows a running list of scanned or inputted items 42 and dispensed products 52.

Figure 3:
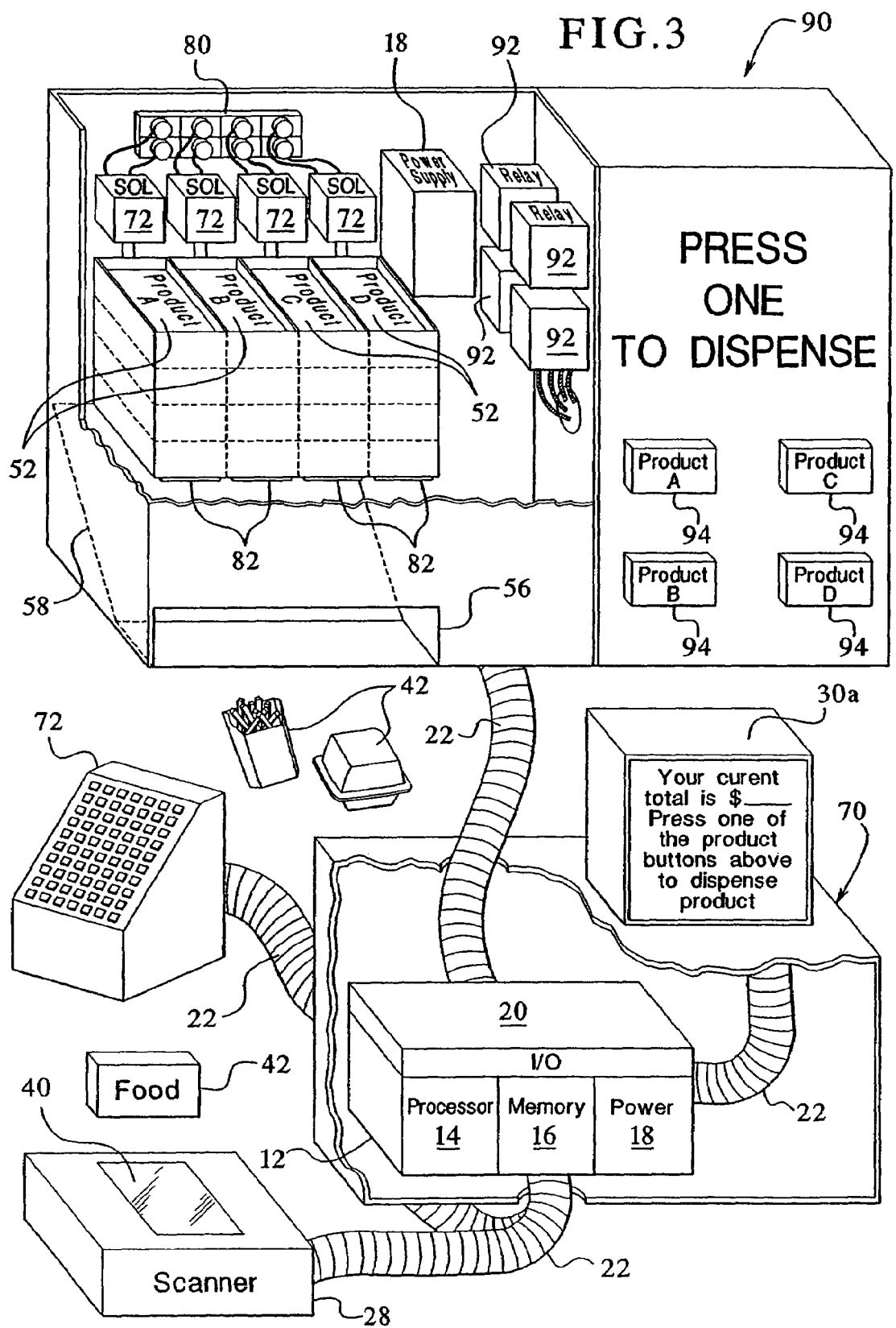
FIG. 3 illustrates another embodiment of a stand-alone point of purchase device of the present invention.

Referring now to FIG. 3, another embodiment for a stand-alone point of purchase device 90 is illustrated. The point of purchase device 90 has a rudimentary level of control capability. That is, the device 90 does not have processing capability or the ability to store a computer program, however, the device 90 does have electrical switching capability. The device 90 includes a power supply 18 and a plurality of relays 92. Relays are well known electrical switching devices that contain a coil on an inlet side and one or more normally open or normally closed contacts on an outlet side. The output side of each relay 92 electrically connects to the solenoids 72, and the input side of each relay electrically connects to an electromechanical pushbutton 94 according to an electrical flowchart commonly referred to as a "ladder logic diagram."

The point of purchase device 90 including the relays 92 has the capability to enable a consumer or a store operator to input a decision, at the device 90, to dispense a point of purchase product 52. The power supply 18 supplies power to the solenoids 72, through the relays 94, and possibly to the pushbuttons 94, for example, if the pushbuttons 94 are lighted. The terminal strip 80 facilitates the wiring. When a consumer or store operator presses one of the pushbuttons 94, a coil on a corresponding relay 92 energizes, a contact within the relay 92 closes and a corresponding solenoid 72 energizes. A lever of the solenoid moves and causes one of the hinged or slideable doors 82, through a suitable mechanical linkage, to open, so that a specified quantity of one of the point of purchase products A to D falls onto the ramp or slide 58 and dispenses through the opening 56. It should be appreciated that those of skill in the art can optimize the number of solenoids 72 and the number of relays 92 necessary to enable the consumer or operator to dispense each of the products 52 from the point of purchase device 90.

It should be appreciated that since the stand-alone point of purchase device 90 has electrical switching capability, but no processing capability, a separate external controller 12 must accomplish all the cost accounting. In an embodiment, a controller 12 maintained within a separate automated purchasing device 70 maintains and recalls prices for the purchasable items 42, such as the food box or the fast food items, and the point of purchase products 52, namely, products A to D. The point of purchase device 90 sends a signal through the wires 22 to the I/O card or module 20 whenever the consumer or store operator dispenses a product. If the products A to D have different associated costs, then the device 90 has the capability to send one of a number of signals to the I/O card or module 20, which corresponds to the particular associated cost.

The stand-alone point of sale device 90 preferably mounts to or near the automated purchasing device 70 so that the device 90 is at the point of purchase. The automated purchasing device 70 may be a self-scanning checkout or a standard checkout as described above in connection with FIG. 2. For the sake of illustration, only the consumer controlled touch screen display 30a is illustrated, however, the store operator controlled touch screen display 30b may alternatively couple to the controller via wires 22 and/or an RS-232 or RS-485 link. The display 30a or 30b alternatively communicates with the controller via an RF signal, microwave signal, the Internet or via any other suitable communication link. Either of the displays 30a or 30b shows a running list of scanned or inputted items 42 and dispensed products 52.

The controller 12, having the processor 14, memory 16, power supply 18 and I/O card or module 20, electrically, optically, via RS-232, RS-485, RF signal, microwave signal, the Internet or by any other suitable communication link connects to a stand-alone or hand-held scanner 28 and/or to a cash register 72. The stand-alone or hand-the scanner 28 includes the transparent cover 40 across which the either the consumer or the store operator passes a purchasable item 42. A store operator preferably runs the cash register 72.

Figure 4:
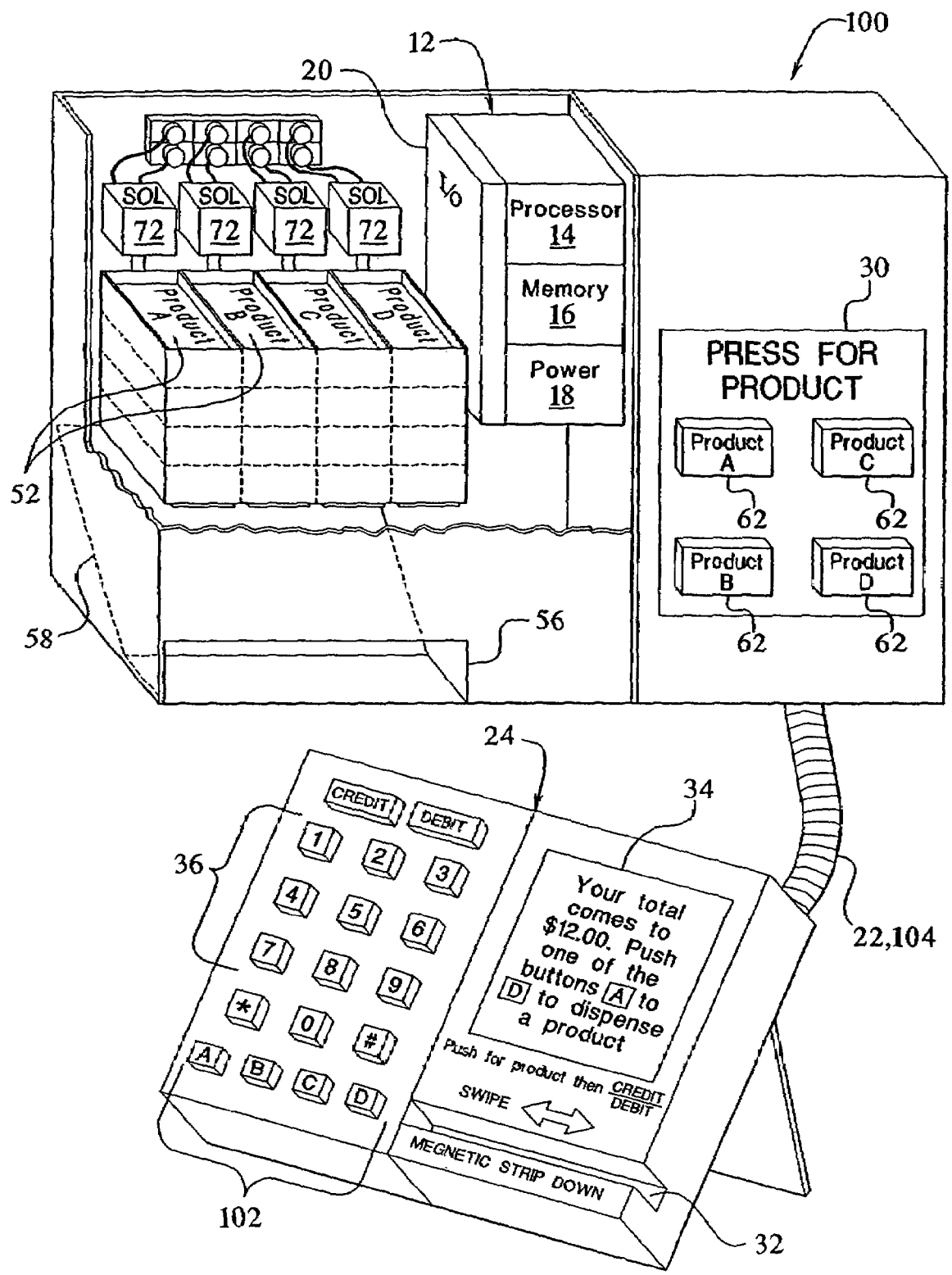
FIG. 4 illustrates a further embodiment of a stand-alone point of purchase device of the present invention.

Referring now to FIG. 4, a further embodiment for a stand-alone point of purchase device 100 is illustrated. The point of purchase device 100 has full control capability. That is, the device 100 can perform electrical switching, has processing capability and the ability to store a computer program. The device 100 includes the controller 12 having the processor 14, the memory device 16, the power supply 18 and the I/O card or module 20. The controller 12 enables the point of purchase device 100 to have a touch screen display 30, with simulated buttons 62 for the dispensable products A to D. Either the consumer or the store operator presses a button 62 on the screen 30 so that an input signal is sent to the I/O card or module 20. Device software stored in the memory device 16 acknowledges the input and commands the closure of a designated output switch on the I/O unit, which allows the power supply 18 to energize the appropriate solenoid 72. The selected product 52 falls onto the ramp or slide 58 and dispenses through the opening 56.

The display 30 can display dynamic advertising for one or more dispensable products 52 and for one or more suppliers of the products 52. The dynamic displays include still video, streaming video and animations as well as any other type of audio, visual or audiovisual display. The display 30 can advertise a plurality of products 52 at once or run a single video that sequentially displays a plurality of different advertisements from one or more suppliers.

In a typical point of purchase environment, smaller suppliers may not have the means to afford advertising for their point of purchase products. For example, providing cardboard displays or physical mock-ups at multiple locations is typically expensive. The present invention provides a method by which any supplier, regardless of its size, can afford at least some advertising. Each of the suppliers can pay for a portion of the total advertising time provided by the display 30. If the display 30 can advertise more than one product 52 at a time, the suppliers can also pay for a percentage of the screen and run a "full-screen ad" or a "half-screen ad" or an ad in any suitable proportion. A supplier can, for example, run a half-screen ad for fifteen percent of the total advertising time and a full screen ad for another fifteen percent of the time.

The controller 12 may be adapted to connect to one or more server computers maintained by one or more suppliers of the products 52 by a linked system commonly referred to as a wide area network or WAN. The WAN links one or more product suppliers by phone line, T-1 or T-3 connections, leased phone lines, RF signals, microwaves or the Internet. The WAN provides suppliers the ability to update or change their advertisements in real time. A supplier may wish to run a certain advertisement in the morning and another in the afternoon. A supplier may wish to change the advertisement based on inventory or to streamline its advertisements with products for which the supermarket or grocery places on sale or discounts.

The suppliers can store a number of advertisements in the memory 16 of the controller 12. The controller 12 includes suitable sound and graphics cards to display the advertisements. The point of purchase devices also include speakers that communicate with the processor 14 of the controller to play programmed sounds. The supplier at a remote location selects which advertisement to display and sends a signal over the WAN, wherein the controller 12 recalls and displays the desired advertisement. Alternatively, as is known by those of skill in the art, the supplier can store the advertisements in files maintained at the supplier's location or on the Internet. When the supplier desires to run a particular advertisement, the supplier downloads the file or files from the remote server or the Internet to the controller 12, which displays the desired advertisement.

The WAN linkage also enables the suppliers of the products 52 to perform inventory management. That is, the WAN provides the suppliers the ability to monitor the movement of the products 52 in real time or over a period of time, e.g., hours, days or weeks. A supplier can determine which products move at particular times of the day, days of the week or times of the year. This aids the suppliers in supplying products 52 that will sell and also in providing targeted and focused advertising. The controller 12 can be configured to automatically send a signal to or place a call to the supplier or the supplier's distributor when a product supply at the point of purchase falls to a certain level. The supplier or distributor thereby automatically knows when to restock the point of purchase device.

Using the real time inventory information provided by the WAN, the Internet, etc., and the ability to change advertisements on the fly or in real time, the supplier can tailor advertisements to push particular products. The supplier can advertise a product 52 at a time that it sells particularly well to maximize throughput. The supplier can alternatively attempt to create a market by advertising a product 52 at a time that it has not sold particularly well. Similarly, if the supplier determines that there is an abundance of stock for a particular product 52, the supplier can advertise that product and/or run a special for the product. If the point of purchase device enables the consumer to accrue points for purchases, the software can be configured to dispense one of the products 52 that is in ample supply when the consumer wins, e.g., a free pack of gum.

Obviously, the supplier is not expected to manually input advertisements at all times. Either the supplier's server computer or the memory 16 of the controller 12 stores sequences that include one or more advertisements that cycle continuously. The supplier updates its sequence periodically to add, subtract or re-proportion the advertisement of one or more products 52. The supplier's sequence integrates with sequences provided by other suppliers. Either the supplier's server or the memory 16 of the controller 12 can also store software that automatically runs a particular advertisement or sequence based on inventory level. For example, if the controller 12 senses that products B, C and D have sold more than Product A, the software in an embodiment is programmed to advertise product A so as to even the dispensing levels.

The stand-alone point of purchase device 100 has the capability to communicate directly with a credit/debit card reader 24 and/or an automated purchasing device 70 (not illustrated), such as a self-scanning checkout or a standard checkout. The touch screen display 30 enables a product to be dispensed at any time before, during or after the scanning or cash registry sequence.

As used herein, the term "credit/debit card" obviously refers to credit cards and debit cards. The term also refers to any type of identification that enables the consumer to pay for a product without using hard currency, e.g., cash, coins or checks. The credit/debit card therefore also includes any type of card or smart card dedicated to a particular institution, such as a school card, retail outlet card, etc. Credit/debit card also includes phone cards, hotel cards, casino cards or other types of service cards that enable the consumer to purchase services and/or goods in a cashless transaction.

Alternatively, after the consumer or the operator has scanned all the purchasable items or the store operator has entered each item into the cash register, the credit/debit card reader 24 prompts the consumer to purchase a dispensable product 52 via the card reader display 34. In an embodiment, the card reader display 34 is a vacuum florescent display ("VFD"). In a preferred embodiment, the consumer can select a dispensable product 52 at any time before an electronic funds transfer takes place, i.e., before a bank or credit card company authorizes the amount. In this way, the consumer makes a single payment.

The credit/debit card reader 24 includes an insert slot 32 and a plurality of numerical input buttons 36. If, after inserting a card into the slot 32, the reader 24 cannot read the card number, the consumer can key in the card number using the numerical input buttons 36. The numerical input buttons 36 can also be used to specify which product (e.g., Product #1 to Product #9) to dispense or the quantity of products 52 to dispense. The card reader 24 may also be adapted to include separate product buttons 102. The VFD 24 directs the consumer to enter a product using either numerical input buttons 36 or the dedicated product buttons 102. The card reader 24 in an embodiment communicates with the controller 12 of the stand-alone device 100 via wires 22 and/or via an RS-232 or RS-485 cable 104. The card reader 24 alternatively communicates with the controller 12 via an RF signal, microwave signal, the Internet or via any other suitable communication link. In an alternative embodiment, the VFD 24 directs the consumer to select one or more products 52 using the touch screen display 30 at the stand-alone point of purchase device 100.

The stand-alone point of sale device 100 preferably mounts to or near the automated purchasing device (scanner or cash register) so that the device 100 is at the point of purchase. The device 100 may also be adapted to enable the consumer to receive cash back from the transaction using funds transferred from the consumer's credit/debit card account.

As stated above, in an embodiment the automated purchasing device 70 is the self-scanning checkout 10 described in FIG. 1. Any of the previously disclosed embodiments for the point of purchase device 50, 90 or 100 may be adapted to couple to the self-scanning checkout 10. The point of purchase device 50, 90 or 100 may be mounted on any exposed surface of the self-scanning checkout 10 including the top, front, rear or sides of the self-scanning checkout 10. The purchasing device may be adapted to dispense a product to a higher or lower elevation and/or horizontally to a new location.

Supermarkets and grocery stores may install a bank of self-scanning checkouts 10 that stand side by side. In such a case, it may be desirable to install a single point of purchase device 50, 90 or 100 between two self-scanning checkouts 10, to dispense products to the same. Here, the point of purchase device 50, 90 or 100 may be mounted on a side of one of self-scanning checkouts 10, wherein the side opposes the other checkout. Or, the point of purchase device 50, 90 or 100 may be mounted separately from and between two adjacent self-scanning checkouts 10.

Supermarkets and grocery stores may install parallel rows of self-scanning checkouts 10 that face each other and are overseen by a single retail operator. In such a case, it may be desirable to install one or more point of purchase devices 50, 90 or 100 between two rows of self-scanning checkouts 10, to dispense products to one or more checkouts of the two rows. In such a case, the point of purchase device 50, 90 or 100 is mounted as a stand-alone unit, separate from any of the self-scanning checkouts 10. The device however, is at the point of purchase between a plurality of rows of self-scanning checkouts 10.

Figure 5:
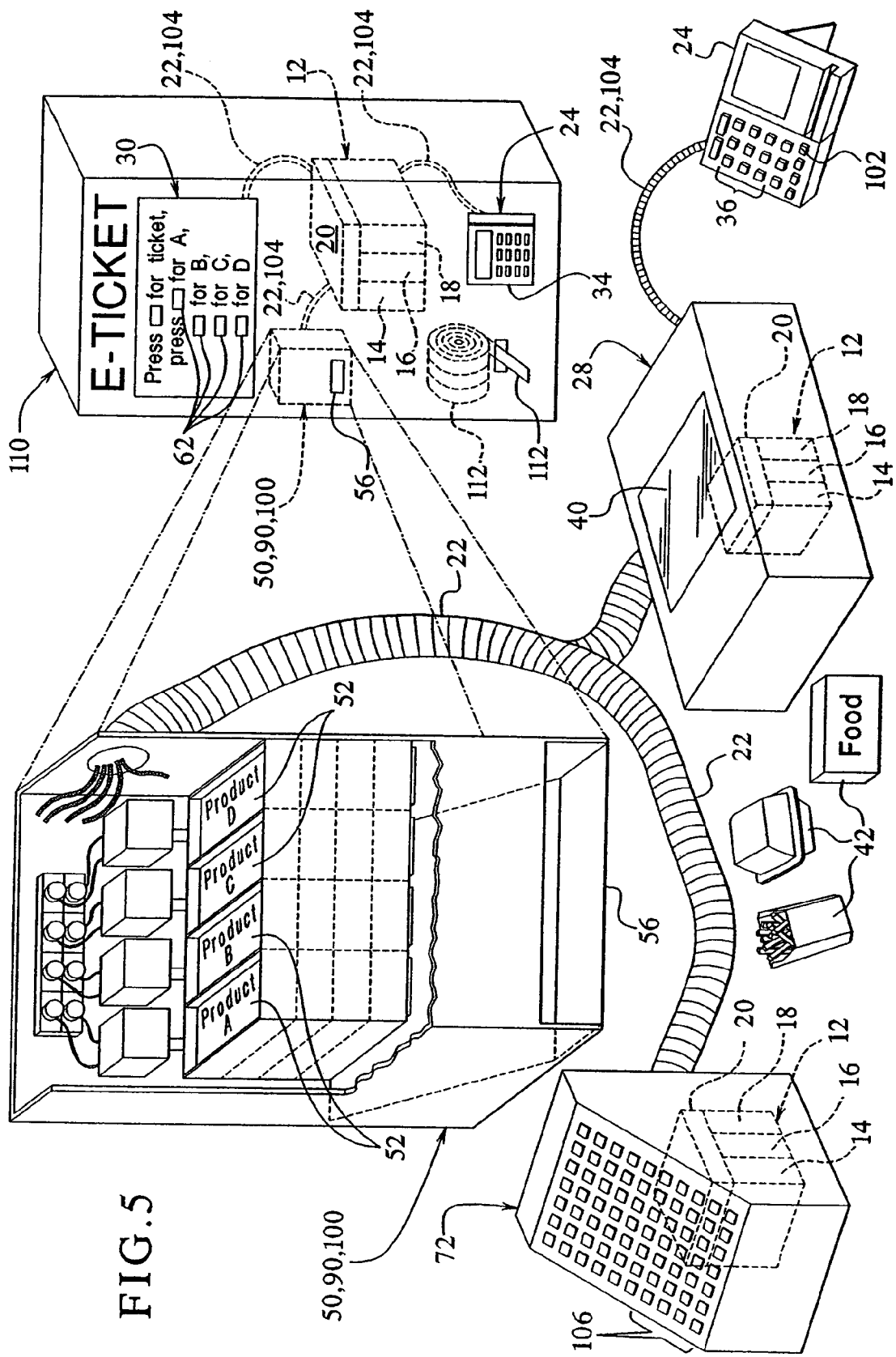
FIG. 5 illustrates a stand-alone point of purchase device in operation with a cash register, a scanner and a non-consumable item dispensing machine.

Referring now to FIG. 5, any of the previously disclosed embodiments for the point of purchase device (50, 90 or 100, only device 50 shown for convenience) may further be adapted to couple directly to a scanner 28, a cash register 72 or simultaneously couple to the scanner 28 and the cash register 72. Alternatively, any of the previously disclosed point of purchase devices 50, 90 or 100 may couple to or be integrally formed within a dispensing device 110 that dispenses non-consumable products 112.

The scanner 28, cash register 72 and dispensing device 110 each include a controller 12 having a processor 14, a memory device 16, a power supply 18 and an I/O card or module 20. The controllers 12 of each of these devices optically couple or electrically couple via wires 22 to a point of purchase device (50, 90 or 100), which dispenses consumable products 52.

The controller 12 integral to the scanner 28 may be adapted to couple, via wires 22 and/or an RS-232 or RS-485 cable 104, to a credit/debit card reader 24 or to a bill acceptor (not illustrated). As used herein, the term "scanner" refers to a conventional scanner that reads bar coded information. "Scanner" also includes any device that reads or accepts any type of identification information provided by a retail item 42. "Scanner," as used herein, includes the speedpass or wand that accepts identifying information from fast food items or other retail items. "Scanner" also includes a device that reads or accepts any type of signal transmission emanating from the item.

The controller 12 integral to the scanner 28 may alternatively be adapted to communicate with the card reader 24 or the bill acceptor via an RF signal, microwave signal, the Internet or via any other suitable communication link. When a consumer or store operator scans purchasable items 42 past the transparent cover 40 of the scanner 28, the controller 12 of the scanner 28 accumulates the cost of the items 42. When the consumer selects a dispensable product 52 via the buttons 36 or 102 on the credit/debit card reader 24, the controller 12 of the scanner 28 recognizes the input, sends a signal to the point of purchase device 50, 90 or 100 to dispense the product 52 and accumulates the additional cost of the dispensed product 52. When the consumer or store operator selects a dispensable product 52 via the input devices located on the point of purchase devices 90 and 100, the controller 12 of the scanner 28 recognizes the input and accumulates the additional cost of the dispensed product 52.

When a store operator inputs purchasable items 42 into the cash register 72, the controller 12 of the cash register 72 accumulates the cost of the items 42. The cash register may be adapted to have certain buttons 106 dedicated to dispense the products 52. When the store operator selects a dispensable product 52 via the button 106 on the cash register 72, the controller 12 of the cash register 72 recognizes the input, sends a signal to the point of purchase device 50, 90 or 100 to dispense the product 52 and accumulates the additional cost of the dispensed product 52. When the consumer or store operator selects a dispensable product 52 via the input devices located on the point of purchase devices 90 and 100, the controller 12 of the cash register 72 recognizes the input and accumulates the additional cost of the dispensed product 52.

Dispensing devices 110 that dispense non-consumable items 112 are known to those of skill in the art. Generally, the controller 12 integral to the dispensing device 110 controls a dispenser (not illustrated), which dispenses non-consumable items 112, such as movie tickets or airline tickets. Non-consumable items include any non-edible items such as tickets, toiletries and periodicals including magazines, newspapers and books. The controller 12 of the dispensing device 110 may be adapted to couple, via wires 22 and/or an RS-232 or RS-485 cable 104, to a credit/debit card reader 24 or to a bill acceptor (not illustrated). A touch screen display 30 electrically communicates with the controller 12 via wires 22 and/or cable 104. Alternatively, an RF signal, microwave signal, the Internet or any other suitable communication link may be used. The display 30 has simulated buttons 62 adapted to enable the consumer to select one or more non-consumable items 112 and one or more consumable products 52 from the point of purchase device 50, 90 or 100.

When the consumer selects a non-consumable item 112 via the buttons 62 on the touch screen display 30, the controller 12 of the dispensing device 110 recognizes the input, sends a signal to the non-consumable item dispenser to dispense the non-consumable item 112 and accumulates the cost of the dispensed item 112. When the consumer selects a consumable product 52 via the buttons 62 on the touch screen display 30, the controller 12 of the dispensing device 110 recognizes the input, sends a signal to the point of purchase device 50, 90 or 100 via wires 22 and/or cable 104 to dispense the consumable product 52 and accumulates the additional cost of the dispensed product 52. The consumer may therefore purchase, for example, a movie ticket and a confectionery item and make one payment via cash or credit.

Referring now to FIGS. 6 and 7, any of the previously disclosed embodiments for the point of purchase device 50, 90 or 100 may further be adapted for a quick service restaurant ("QSR"). QSRs are continuously looking for technologies that alleviate their limited space and labor issues, increase operational efficiencies and mitigate product shrinkage. QSRs typically require floor space in front of the cashiers to be open, wherein customers form lines, peruse overhead menus and order food upon approaching a cashier. Thus while QSRs provide a captive market for point of purchase products, they do not provide a convenient place for a typical grocery store rack.

Drive through stands also provide a captive front-end marketplace. Outdoor drive through stands, however, do not provide a suitable location for a product rack. Shrinkage, both inside and at the drive through stand, poses a serious barrier to the introduction of front-end products. Cashiers at QSRs, who must deliver prepared food items as well as receive and exchange money, do not have enough extra time to ensure that off-the-rack items are accounted for. It should be appreciated, however, that any of the point of purchase devices 50, 90 or 100 are operable in a QSR environment.

FIG. 6 illustrates the point of purchase device 50, 90 or 100 implemented inside the QSR at the cashier station. The cashier 114 stands behind the QSR counter 116. The customer 118 observes an overhead display 122 that sets forth a number of fast food items 42 that the QSR prepares and brings to the point of purchase. The display 122 also presents a number of products 52 that the customer 118 can purchase and that will immediately be dispensed at the point of purchase.

The point of purchase device 50, 90 or 100, including the dispenser 54 (not illustrated), flush mounts to the backside of the cash register and includes a touch screen display 30. The cash register/point of purchase device 50, 90 or 100 includes a controller having a processor and a memory that stores a program. In an embodiment, as soon as the cashier 114 begins to enter the order of the customer 118, the program and the processor cooperate to display the message 124 and activate the simulated input buttons 62. When the cashier 114 enters a payment from the customer 118, the program and the processor cooperate to discontinue the message 124 and deactivate the simulated input buttons 62. At any time in between, the customer 118 can select one of the input buttons 62, wherein a product 52 dispenses through an opening 56 into a tray 142 (which can also be the coin change tray, see FIG. 9 below) and the cost of the product 52 automatically accumulates with the cost of the fast food items 42.

The procedure above is virtually invisible to the cashier 114. The QSR employees or the product suppliers can restock the products 52 during non-business hours. In an alternative embodiment, the point of purchase device 50, 90 or 100 prompts the cashier 114 to ask the customer 118 to purchase one or more products 52. A second dispenser 126 mounts inside the counter 116 and dispenses periodicals or other consumable or non-consumable products 52. The second dispenser 126 can operate according to the computer program discussed above, wherein the customer 118 purchases a magazine or newspaper by pressing a button 62 while ordering the items 42. Alternatively, the customer 118 requests a periodical from the cashier 114, wherein the cashier 114 presses a button on the cash register, a door on the dispenser 126 opens, the customer 118 removes the selected product 52 and the cost of the product automatically adds to the cost of the fast food items 42. Each of these embodiments consumes no floor space and requires little effort by the cashier 114.

FIG. 7 illustrates the point of purchase device 50, 90 or 100 implemented outside the QSR at the drive-up window. QSRs typically employ a display, such as the overhead display 122 of FIG. 6, at a drive-through ordering station (not illustrated). This display can present the point of purchase products 52, as does the display 122 of FIG. 6. In the illustrated embodiment, the drive-up customer 118 encounters a touch screen display 30 having simulated input buttons 62 when the customer 118 pulls up to the exchange window. As the customer 118 waits for the fast food, the message 128 prompts the customer 118 to purchase, e.g., a pack of gum. Additionally or alternatively, the cashier (not illustrated) can prompt the customer 118 to purchase a product 52. If the customer selects a button 62, a product 52 dispenses through the opening 56 into the tray 142 (in an embodiment with coin change as discussed with FIG. 9) and the cost of the product 52 automatically accumulates with the cost of the fast food items 42. Suitable precautions may be employed to counteract product shrinkage, such as automatically deactivating the buttons 52 before accepting money from the customer. Alternatively, the dispensing buttons 62 can be located inside at the cashier station, wherein the customer 118 requests that the cashier dispense a product 52 for the customer.

Figure 8:
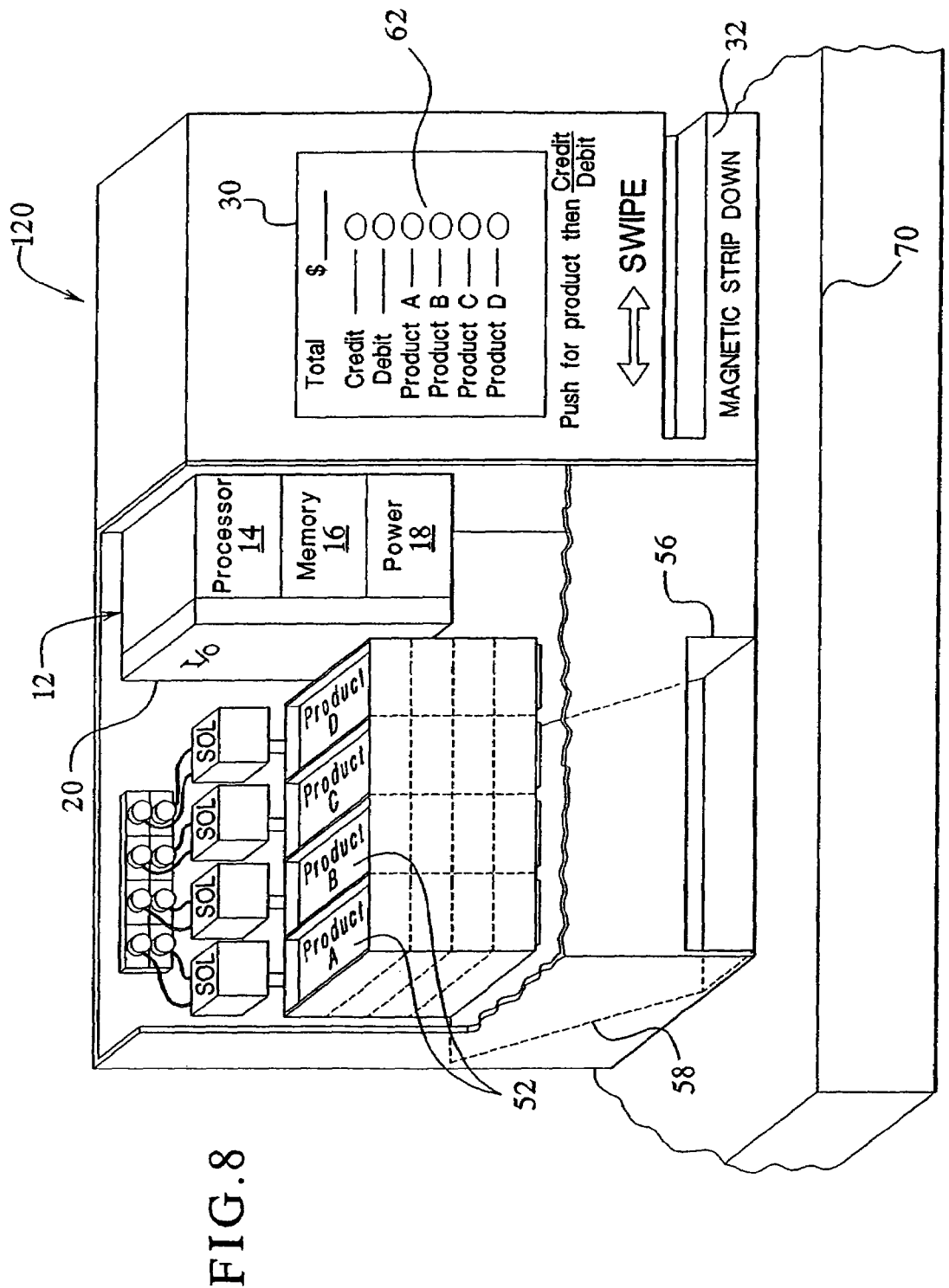
FIG. 8 illustrates yet another embodiment of a stand-alone point of purchase device having an integrated method of payment.

Referring now to FIG. 8, yet another embodiment for a stand-alone point of purchase device 120, which has an integrated method of payment, is illustrated. The device 120 mounts to or near the automated purchasing device 70 (scanner or cash register) so that the device 120 is at the point of purchase. The device 120 may include one or more mounting brackets or members that allow the device 120 to readily mount to the device 70.

The point of purchase device 120 includes a controller 12 having a processor 14, memory device 16, power supply 18 and I/O card or module 20. The consumer selects one or more of the products A to D by pressing the simulated input buttons 62 on a touch screen display 30, wherein the inputs 62 couple to the I/O card or module 20. The device 120 dispenses the product 52 onto the ramp or slide 58 and through the opening 56. The controller 12 communicates with the touch screen display 30 and either a credit/debit card insert slot 32 a cash/coin acceptor (not shown). Before, during or after the other purchasable items are scanned or entered into a cash register, the consumer may select one or more of the buttons and purchase one or more of the products 52. The player pays for the one or more dispensed products 52 using a credit card, debit card or cash. The purchase is made at the point of purchase for the other purchasable items.

Referring now to FIG. 9, still another embodiment of a stand-alone point of purchase device 130 is illustrated, wherein device 130 dispenses the product 52 and also dispenses change in the form of coins. The device 130 electrically couples to any of the automated purchasing devices disclosed above. The device 130 includes a plurality of slot openings 132 for holding the dispensable products 52. A controller 12 having a processor, memory, power supply and I/O capability controls one or more solenoids, such as a push-type solenoid 72. When a solenoid 72 energizes, a product 52 dispenses through a slot 134. The illustrated embodiment includes a plurality of slots 134, here, a separate slot 134 for each for each different product 52.

The device 130 includes a conveyor belt 136 tensioned between a drive roller 138 and a follower roller 140. The memory stores a program that operates with the processor so that upon an input to dispense one of the products 52 by a consumer or a store operator, the program and processor cause a product 52 to dispense through its associated slot 134. At the same time, the program and processor of the controller 12 cause a drive motor (not illustrated) to rotate and the belt 136 to move. The product 52 drops onto the conveying belt 136, which conveys the product to a tray 142.

The belt and rollers are just one way known by those of skill in the art to convey the dispensed product 52. For instance, the motor can couple to a lead screw, wherein a product-carrying slide translates when the motor rotates. For quicker movements, a pneumatic system can be employed. Further alternatively, a ramp or slide can be disposed at a vertical angle, wherein gravity pulls the product 52 into the tray 142. In any embodiment, the tray 142 is located at the point of purchase for one or more other purchasable items.

The point of purchase device 130 also includes a plurality of coin holders 144 for dispensing change. The program and the processor control a plurality of solenoids 72 to allow a proper amount of pennies, nickels, dimes and quarters to dispense from one or more of the coin holders. The device 130 is therefore adapted to dispense one or more products 52 and coin change to the consumer for a transaction including a transaction having scanned items or items inputted into a cash register. As such, the device may be adapted to include an agitator (not illustrated) in communication with the controller 12 that vibrates the device 130 to aid in properly dispensing the coins and the products 52.

In any of the embodiments provided herein, one or more point of purchase product sellers is able to distribute their point of purchase products 52. That is, the sellers stock, display and sell the point of purchase products through the self-scanning checkout, through one of the stand-alone point of purchase devices or through a combination consumable product and non-consumable product dispensing device.

The manufacturers of these devices benefit when a retail outlet purchases one or more of the devices. The point of purchase product sellers (manufacturer and/or distributor) benefit from the sale of these devices because they can display and distribute their products through these devices and increase brand recognition. The retail outlets benefit from the sale of these devices through increased throughput, by providing convenience and speed, by reducing labor costs and by making point of purchase sales. The devices, however, cost money.

The present invention includes a method of making these devices more economical for the retail outlets, i.e., funding the devices. In one embodiment, the point of purchase product seller pays a lump-sum or alternatively a plurality of continuous royalty payments to the retail outlets in exchange for the right to stock the seller's product. In this manner, the retail outlet recoups some of its out-of-pocket cost for the devices. In another embodiment, the point of purchase product seller pays continuous royalty payments or more likely a lump-sum payment to the device manufacturer. In this manner, the manufacturer can sell the device at a lower price (or the product seller pays part of the normal price) so that the retail outlet pays less up front. Here, the retail outlet makes a lower up-front payment, but the product seller likely owns rather than leases at least part of the stocking space.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A point of purchase checkout device comprising:
    a scanner for detecting an RFID tag on a purchasable item;
    a dispenser proximate to the scanner for housing and dispensing a point of purchase product; and
    a controller in operative communication with the scanner and the dispenser for calculating the cost of the purchase item and the point of purchase product, wherein the scanner, dispenser, and controller are a part of a single integral device.

2. The device of claim 1 wherein the RFID tag contains purchasable item information selected from the group consisting of price, inventory data, location data, purchase trend data and combinations thereof.

3. The device of claim 1 wherein the scanner is an RFID interrogator.

4. The device of claim 1 wherein the scanner is selected from the group consisting of a stationary scanner, a moveable scanner and a hand-held scanner.

5. The device of claim 1 wherein the dispenser dispenses the point of purchase product responsive to a user selection.

6. The device of claim 1 further comprising a display device in operative communication with the controller, the display device displaying information selected from the group consisting of the cost of the purchasable item, the cost of the point of purchase product, and combinations thereof.

7. The device of claim 6 wherein the display device further comprises a prompt for encouraging the purchase of the point of purchase product.

8. The device of claim 1 further comprising a container for containing purchasable items detected by the scanner.

9. The device of claim 8 wherein the dispenser dispenses the point of purchase product into the container.

10. A method of purchasing items comprising: providing a checkout device having a scanner and a dispensing device for housing and dispensing a point of purchase product;
    detecting an RFID tag affixed to a purchasable item with the scanner;
    displaying the cost of the purchasable item with a display device;
    dispensing a point of purchase product from the dispenser in response to a selection made through the display; and
    calculating with the checkout device the cost of the detected purchasable item and the dispensed point of purchase product.

11. The method of claim 10 wherein the dispensing occurs in response to a user selection.

12. The method of claim 10 further comprising prompting a user to purchase the point of purchase product with the display device.

13. The method of claim 10 further comprising dispensing the point of purchase product into a container for containing purchasable items detected by the scanner.

14. A method of purchasing items from a checkout device comprising:
    detecting an RFID tag affixed to a purchasable product with a scanner that is part of a checkout device;
    offering a consumer a point of purchase product from a dispenser that is also a part of the checkout device;
    displaying the cost of the purchasable product on a display;

dispensing the point of purchase product from the dispenser responsive to a consumer selection through the display; and calculating with the device the cost of the detected purchasable item and the selected point of purchase item.

15. The method of claim 14 further comprising selecting by the consumer the point of purchase product from a display device operatively connected to the checkout device.

16. A checkout comprising:
a scanner to detect an RFID tag on an item;
a video monitor to display the cost of the item and allow a consumer to select a point of purchase product through the video monitor;
a packaging area for placing the item into a container; and
a dispenser for storing and dispensing the point of purchase product, wherein the video monitor displays the cost of the product dispensed by the dispenser.

17. The checkout of claim 16, wherein the dispenser dispenses the product into the container.

18. The checkout of claim 16, wherein the dispenser dispenses the product adjacent to the scanner.

19. The checkout of claim 16 wherein the dispenser dispenses the product adjacent to a device selected from the group consisting of: the video monitor, a change maker that makes change from payments for items and products purchased and a receipt printer that provides a receipt for items and products purchased.

20. A checkout device that identifies RFID tags comprising:
a surface for allowing a customer to place a plurality of items to be purchased that include RFID tags;
a scanner for identifying RFID products and allowing the customer to accumulate a cost for the items and displaying the cost on a video monitor;
a point of purchase device that stores and dispenses a confectionary product into container upon request of the consumer made through the video monitor; and
the cost of the confectionary product is added to the cost of the plurality of items automatically.

21. A device allowing a consumer to purchase RFID tagged products and confectionary products without the need for a cashier comprising:
a body having an interior;
a controller coupled to the body;
a device that communicates with and is coupled to the controller, the device allowing a consumer to purchase items that have an RFID tag that the consumer brings to the device and accumulate a cost for the items;
a display for displaying the cost of the items:
a confectionary product stored within the interior of the body;
a prompt to encourage a consumer to purchase the confectionary product; and
a dispenser that dispenses the confectionary product from the body upon a request for the confectionary product by the consumer, the request being made using the display, wherein a cost for the confectionary product is added to the cost for the items that have an RFID tag.

22. The device of claim 21, wherein the controller is integral with the body.

23. The device of claim 21, wherein the controller is coupled to the body by a mode selected from the group consisting of: electrical coupling, optical coupling and coupling via a radio frequency signal.

24. The device of claim 21, wherein the scanning device is coupled to the controller by a mode selected from the group consisting of: electrical coupling, optical coupling and coupling via a radio frequency signal.

25. The device of claim 21, wherein the dispenser dispenses the product in a direction selected from the group consisting of: vertically upward, vertically downward and laterally.

26. The device of claim 21, wherein the scanning device is integral with the controller.

27. The device of claim 21, which includes a display that prompts the consumer to purchase the product.

28. The device of claim 21, wherein the body includes a plurality of different confectionary products.

29. The device of claim 21, wherein the plurality of different confectionary products includes chewing gum.

30. A point of purchase device that operates with an automated purchasing device that identifies an RFID tagged item and includes a display, the point of purchase device allows a consumer to purchase consumable items that are not otherwise available to the consumer without the need for a cashier, accumulating a cost for the items and allowing the consumer to pay for a product, the point of purchase device comprising:
a body housing the consumable product;
a controller coupled to the body; and
a dispenser that dispenses the consumable product from the body upon a signal from the controller, the signal initiated by the consumer by touching a portion of the display, wherein a cost for the product is displayed on the display and added to the cost of the RFID tagged items, whose cost is also displayed on the display.

31. The point of purchase device of claim 30, wherein the body is modular and physically independent from the automated purchasing device.

32. The point of purchase device of claim 30, the display communicates with the controller and prompts the consumer to purchase the consumable product.

33. A point of purchase checkout device comprising:
a purchasable item having an RFID tag affixed thereto;
a scanner for detecting the RFID tag;
a dispenser for dispensing a point of purchase product;
a controller in operative communication with the scanner and the dispenser for calculating the cost of the purchase item and the point of purchase product; and
a display device in operative communication with the controller, the display device displaying the cost of the purchasable item, the display device providing a prompt during the RFID scanning process for encouraging the purchase of the point of purchase product, and the display device receiving a request from the consumer for the point of purchase product.

34. A method of purchasing items comprising:
providing a checkout device having a scanner proximate to a dispensing device for dispensing a point of purchase product;
detecting an RFID tag affixed to a purchasable item with the scanner;
displaying the cost of the purchasable item after it is detected by the scanner;
prompting the purchase of a point of purchase product using a video monitor that displays the cost of the purchasable item; requesting the point of purchase product through the video monitor;
dispensing a point of purchase product from the dispenser; and
calculating with the checkout device the cost of the detected purchasable item and the dispensed point of purchase product.

35. A method of purchasing items from a checkout device comprising:
- detecting RFID tags affixed to a plurality of purchasable products with a scanner and displaying a cost of each product on a video monitor;
- prompting a consumer, while the consumer is scanning product, to purchase a point of purchase product from a dispenser using the video monitor, requesting the point of purchase product through the video monitor;
- dispensing the point of purchase product from the dispenser responsive to a consumer selection; and
- calculating with the device the cost of the detected purchasable item and the selected point of purchase item.

36. The method of claim 35 wherein the prompt is an audio prompt.

37. A checkout comprising:
- a scanner to detect an RFID tag on an item;
- a video monitor to display the cost of the item;
- a packaging area for placing the item into a container; and
- a dispenser for storing and dispensing a point of purchase product, wherein the video monitor displays the cost of the product dispensed by the dispenser and prompts the purchase of the point of purchase product, a request for the point of purchase product being made through the monitor.

38. A device allowing a consumer to purchase RFID tagged products and confectionary products without the need for a cashier comprising:
- a body having an interior;
- a controller coupled to the body;
- a device that communicates with and is coupled to the controller, the device allowing a consumer to purchase items that have an RFID tag that the consumer brings to the device and accumulate a cost for the items;
- a confectionary product stored within the interior of the body;
- a video monitor that displays the cost of items and prompts the consumer while the consumer is accumulating a cost from the purchase items to encourage the consumer to purchase the confectionary product; and
- a dispenser that dispenses the confectionary product from the body upon a request for product by the consumer, wherein a cost for the confectionary product is added to the cost of the items that have an RFID tag, the consumer requesting the confectionary product through the monitor.

39. The device of claim 37 wherein the prompt is an audio prompt.

* * * * *